(12) United States Patent
Chang et al.

(10) Patent No.: US 9,263,941 B2
(45) Date of Patent: Feb. 16, 2016

(54) POWER FACTOR-CORRECTED RESONANT CONVERTER AND PARALLEL POWER FACTOR-CORRECTED RESONANT CONVERTER

(71) Applicant: Macroblock, Inc., Hsinchu (TW)

(72) Inventors: Lon-Kou Chang, Hsinchu (TW); Yi-Wen Huang, Hsinchu (TW); Han-Hsiang Huang, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 691 days.

(21) Appl. No.: 13/633,682

(22) Filed: Oct. 2, 2012

(65) Prior Publication Data

US 2013/0154372 A1  Jun. 20, 2013

(30) Foreign Application Priority Data

Dec. 14, 2011  (TW) .............................. 100146337 A

(51) Int. Cl.
*H02M 1/42* (2007.01)
*H02M 1/00* (2007.01)

(52) U.S. Cl.
CPC .... *H02M 1/4241* (2013.01); *H02M 2001/0058* (2013.01); *H02M 2001/0067* (2013.01); *Y02B 70/126* (2013.01); *Y10T 307/406* (2015.04)

(58) Field of Classification Search
CPC ............. H02M 2001/0058; H02M 2001/0067; H02M 2001/007; H02M 2001/008; H02M 1/4241; H02M 3/1582
USPC ........ 323/207, 259, 262, 263; 363/21.02, 265
See application file for complete search history.

(56) References Cited

U.S. PATENT DOCUMENTS

| | | | | | |
|---|---|---|---|---|---|
| 4,257,090 | A | * | 3/1981 | Kroger | H02M 3/1584 323/222 |
| 5,576,940 | A | * | 11/1996 | Steigerwald | H02J 1/102 363/17 |
| 6,515,457 | B1 | * | 2/2003 | Maniktala | H02M 3/155 323/222 |
| 2006/0120120 | A1 | * | 6/2006 | Lin | H02M 3/285 363/65 |
| 2009/0122578 | A1 | * | 5/2009 | Beltran | H02M 3/33507 363/16 |
| 2010/0067273 | A1 | * | 3/2010 | Chen | H02M 1/32 363/125 |
| 2010/0141188 | A1 | * | 6/2010 | Kakebayashi | H02P 27/08 318/400.3 |
| 2010/0309697 | A1 | * | 12/2010 | Werle | H02M 1/4208 363/126 |

* cited by examiner

*Primary Examiner* — Jue Zhang
*Assistant Examiner* — Lakaisha Jackson
(74) *Attorney, Agent, or Firm* — Locke Lord LLP; Tim Tingkang Xia, Esq.

(57) ABSTRACT

A resonant converter with power factor correction includes a power-obtaining circuit, an energy-storage element and an energy-transferred circuit. The power-obtaining circuit is used for receiving an input line voltage. The energy-storage element is coupled between the power-obtaining circuit and the energy-transferred circuit. The energy-transferred circuit is used for generating an output power. In a first time period, based on a first control signal, the energy-storage element and the power-obtaining circuit operate a soft switching so that the energy-storage element is charged to obtain the input line power and generate an energy-storage voltage. In a second time period, based on a second control signal, the energy-storage element and the energy-transferred circuit operate a soft switching so that the energy-storage element is discharged to make the energy-storage voltage converted into the output power.

37 Claims, 13 Drawing Sheets

POWER FACTOR-CORRECTED RESONANT CONVERTER AND PARALLEL POWER FACTOR-CORRECTED RESONANT CONVERTER

CROSS-REFERENCE TO RELATED APPLICATIONS

This non-provisional application claims priority under 35 U.S.C. §119(a) on Patent Application No(s). 100146337 filed in Taiwan, R.O.C. on Dec. 14, 2011, the entire contents of which are hereby incorporated by reference.

BACKGROUND OF THE INVENTION

1. Technical Field

The disclosure relates to a power-factor-corrected converter, and more particularly to a power-factor-corrected resonant converter and a parallel power-factor-corrected resonant converter.

2. Related Art

Generally, most conventional circuits for power factor correction (PFC) employ an inductor as an energy-storage element and employ a boost control topology for correcting power factor and transferring the energy to a load. Therefore, the material of the core of the inductor should be taken into consideration in order to avoid large hysteresis loss caused by pulse current. Furthermore, the size of the circuit is increased by using the inductor as an energy-storage element.

In order to maintain the stability of the boost control topology, additional compensation capacitors and complicated control circuit including circuit element such as an analog multiplier, are required to achieve the power factor correction. Furthermore, in the above mentioned circuit, other circuit elements having functions of frequency jitter, quasi resonant or valley switching are also included in the clock control signals in order to reduce the generation of electromagnetic interference (EMI).

Furthermore, because the boost control typology is employed for power factor correction, the output voltage in the circuit will be boosted to a higher voltage level such as 600V. Therefore, switching elements (e.g. elements with a maximum rating Drain-Source voltage above 600V) which can resist high voltage should be employed in the circuit. Accordingly, circuits for power factor correction are still required to be improved.

SUMMARY OF THE INVENTION

In one aspect, the disclosure provides a power-factor-corrected resonant converter, comprising a power-obtaining circuit, a first energy-storage element and a first energy-transferred circuit. The power-obtaining circuit has an input end and an output end, the input end of the power-obtaining circuit receives an input line voltage; the power-obtaining circuit comprises a first inductor, a first diode and a first switch. A first end of the first energy-storage element is coupled to the output end of the power-obtaining circuit, and a second end of the first energy-storage element is coupled to the ground. The first energy-transferred circuit has an input end and an output end, the input end of the first energy-transferred circuit is coupled to the first end of the first energy-storage element, and an output power is generated by the output end of the first energy-transferred circuit. The first energy-transferred circuit comprises a second inductor, a second diode, a third diode and a second switch.

During a first time period, based on a first control signal, the first energy-storage element and the power-obtaining circuit operate a soft switching through the first inductor, the first diode and the first switch of the power-obtaining circuit, so that the first energy-storage element is charged with the input line voltage in order to generate an energy-storage voltage for obtaining the input line power. During a second time period, based on a second control signal, the first energy-storage element and the first energy-transferred circuit operate a soft switching through the second inductor, the second diode, the third diode and the second switch of the first energy-transferred circuit, so that the first energy-storage element is discharged to transfer energy and the energy-storage voltage is converted into a first output power.

In another aspect, the disclosure provides a parallel power-factor-corrected converter. The parallel power-factor-corrected converter comprises a plurality of power-factor-corrected converters which are coupled to each other in parallel connection. Each power-factor-corrected converter comprises a power-obtaining circuit, an energy-storage element and an energy-transferred circuit. The power-obtaining circuit has an input end and an output end, the input end of the power-obtaining circuit receives an input line voltage; the power-obtaining circuit comprises a first inductor, a first diode and a first switch. A first end of the energy-storage element is coupled to the output end of the power-obtaining circuit, and a second end of the energy-storage element is coupled to the ground. The energy-transferred circuit has an input end and an output end, the input end of the energy-transferred circuit is coupled to the first end of the energy-storage element, and an output power is generated by the output end of the energy-transferred circuit. The energy-transferred circuit comprises a second inductor, a second diode, a third diode and a second switch.

During a first time period, based on a first control signal, the energy-storage element and the power-obtaining circuit operate a soft switching through the first inductor, the first diode and the first switch of the power-obtaining circuit, so that the energy-storage element is charged with the input line voltage in order to generate an energy-storage voltage for obtaining the input line power. During a second time period, based on a second control signal, the energy-storage element and the energy-transferred circuit operate a soft switching through the second inductor, the second diode, the third diode and the second switch of the energy-transferred circuit, so that the energy-storage element is discharged and to transfer energy and the energy-storage voltage is converted into the output power. The input ends of the power-obtaining circuits are coupled to each other, and the output ends of the energy-transferred circuit are coupled to each other.

In another aspect, the disclosure provides a power-factor-corrected converter. The power-factor-corrected converter comprises a power-obtaining circuit, an energy-storage element and an energy-transferred circuit. The power-obtaining circuit has an input end and an output end, the input end of the power-obtaining circuit receives an input line voltage; the power-obtaining circuit comprises a first inductor, a first diode and a switch. A first end of the energy-storage element is coupled to the output end of the power-obtaining circuit, and a second end of the energy-storage element is coupled to the ground. The energy-transferred circuit has an input end and an output end, the input end of the energy-transferred circuit is coupled to the first end of the energy-storage element, and an output power is generated by the output end of the energy-transferred circuit. The energy-transferred circuit comprises a seventh inductor, a fourteenth diode and a fifteenth diode.

Based on a control signal, the energy-storage element and the power-obtaining circuit operate a soft switching through the first inductor, the first diode and the switch of the power-obtaining circuit, so that the energy-storage element is charged with the input line voltage in order to generate an energy-storage voltage for obtaining the input line power. When the voltage level of the input line voltage is larger than the voltage level of the output end of the energy-transferred circuit, the seventh inductor, the fourteenth diode and the fifteenth diode of the energy-transferred circuit are in conduction automatically, so that the energy-storage voltage is converted into the output power by the energy-transferred circuit.

The present invention will become more fully understood by reference to the following detailed description thereof when read in conjunction with the attached drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

Figure 1:
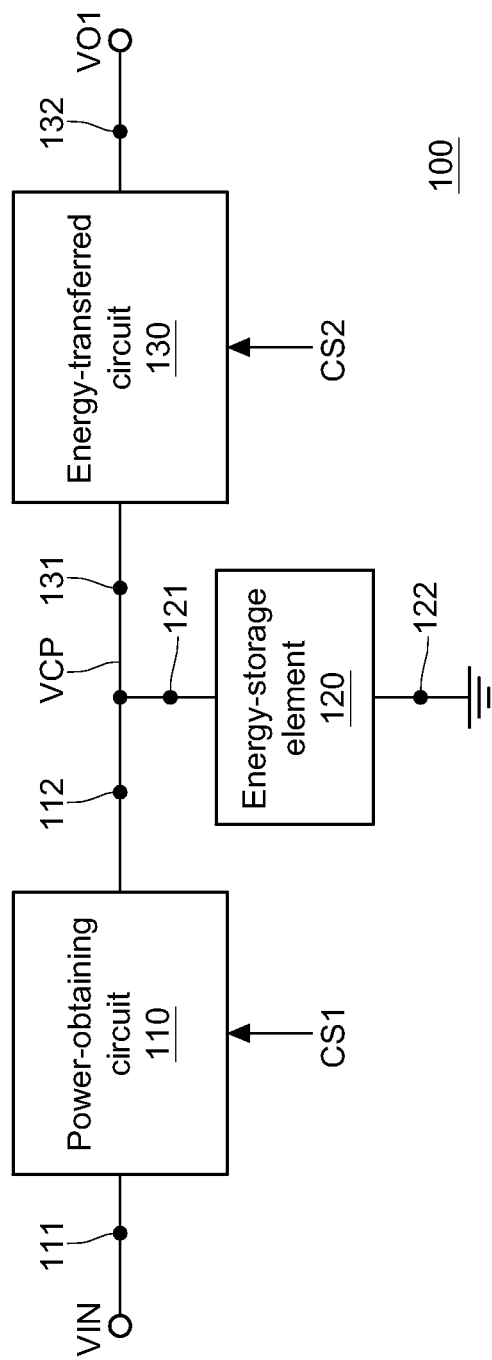
FIG. 1 is an illustration of a power-factor-corrected resonant converter according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the above problems, some of the embodiments of the disclosure provides a power-factor-corrected resonant converter and parallel power-factor-corrected resonant converter, by which the hysteresis loss of voltage conversion can be reduced, circuits for restraining the generation of electromagnetic interference can be simplified, switching elements with lower rating Drain-Source voltage can be employed and better power factor can be achieved.

FIG. 1 is an illustration of a power-factor-corrected resonant converter according to a first embodiment of the disclosure. The power-factor-corrected resonant converter 100 of this embodiment is also referred to as a power-factor-corrected LC-LC converter.

The power-factor-corrected resonant converter 100 comprises a power-obtaining circuit 110, an energy-storage element 120 and an energy-transferred circuit 130. The power-obtaining circuit 110 has an input end 111 and an output end 112. The input end 111 of the power-obtaining circuit 110 receives an input line voltage VIN. The power-obtaining circuit 110 comprises a first inductor, a first diode, a fourth diode and a first switch. The detailed embodiment of the first inductor, the first diode, the fourth diode and the first switch of the power-obtaining circuit 110 will be illustrated later by referring to the embodiment in FIG. 2. A first end 121 of the energy-storage element 120 is coupled to the output end 112 of the power-obtaining circuit 110, and a second end 122 of the energy-storage element 120 is coupled to the ground. The energy-storage element 120 can be a capacitor element which may have a very small size.

The energy-transferred circuit 130 has an input end 131 and an output end 132. The input end 131 of the energy-transferred circuit 130 is coupled to the first end 121 of the energy-storage element 120, and the output end 132 of the energy-transferred circuit 130 generates an output power VO1. The energy-transferred circuit 130 comprises a second inductor, a second diode, a third diode and a second switch. The detailed embodiment of the second inductor, the second diode, the third diode and the second switch of the energy-transferred circuit 130 will be illustrated later by referring to the embodiment in FIG. 2.

During a first time period, based on a control signal CS1, the energy-storage element 120 and the power-obtaining circuit 110 operate a soft switching by using the first inductor, the first diode, the fourth diode and the first switch of the power-obtaining circuit 110, so that the energy-storage element 120 is charged with an input line voltage VIN and generates an energy-storage voltage VCP to obtain the input line power.

During a second time period, based on a control signal CS2, the energy-storage element 120 and the energy-transferred circuit 130 operate a soft switching by using the second inductor, the second diode, the third diode and the second switch of the energy-transferred circuit 130, so that the energy-storage element 120 is discharged to transfer energy and thus the energy-storage voltage VCP is converted into the output power VO1.

In this embodiment, the voltage level of the energy-storage voltage VCP can be designed as one time or two times of the input line voltage VIN, i.e. VCP=VIN or VCP=2×VIN. Furthermore, the converting from the energy-storage voltage VCP into the output power VO1 is performed by discharging the energy-storage voltage VCP of the energy-storage element 120 to 0V and then converting the voltage of the energy-storage voltage VCP into the output power VO1 Furthermore, the input line voltage VIN may be an AC voltage or a DC voltage, and an AC voltage is more suitable for power factor correction.

The power-factor-corrected resonant converter 100 of this embodiment can obtain a better power factor by the two operations of soft switching, i.e., the energy-storage element 120 obtains the input line power and captures energy and converts the energy into the output power VO1. Therefore, stable output voltage or current can be provided by this embodiment.

In another embodiment, the power-obtaining circuit 110 can further comprise a fourth diode. In this case, the energy-storage element 120 and the power-obtaining circuit 110 operate soft switching through the first inductor, the first diode, the fourth diode and the first switch of the power-obtaining circuit 110. The same effect can be achieved with the fourth diode or without the fourth diode. The detailed embodiment of the fourth transistor of the power-obtaining circuit 110 will be illustrated later by referring to the embodiment in FIG. 2.

The relationships between the elements of the power-factor-corrected resonant converter 100 and their related operations are described briefly above. The coupling ways for the first inductor, the first diode, the fourth diode and the first switch of the power-obtaining circuit 110 as well as the second inductor, the second diode, the third diode and the second switch of the energy-transferred circuit 130 will be described in details below by using other embodiments.

Figure 2:
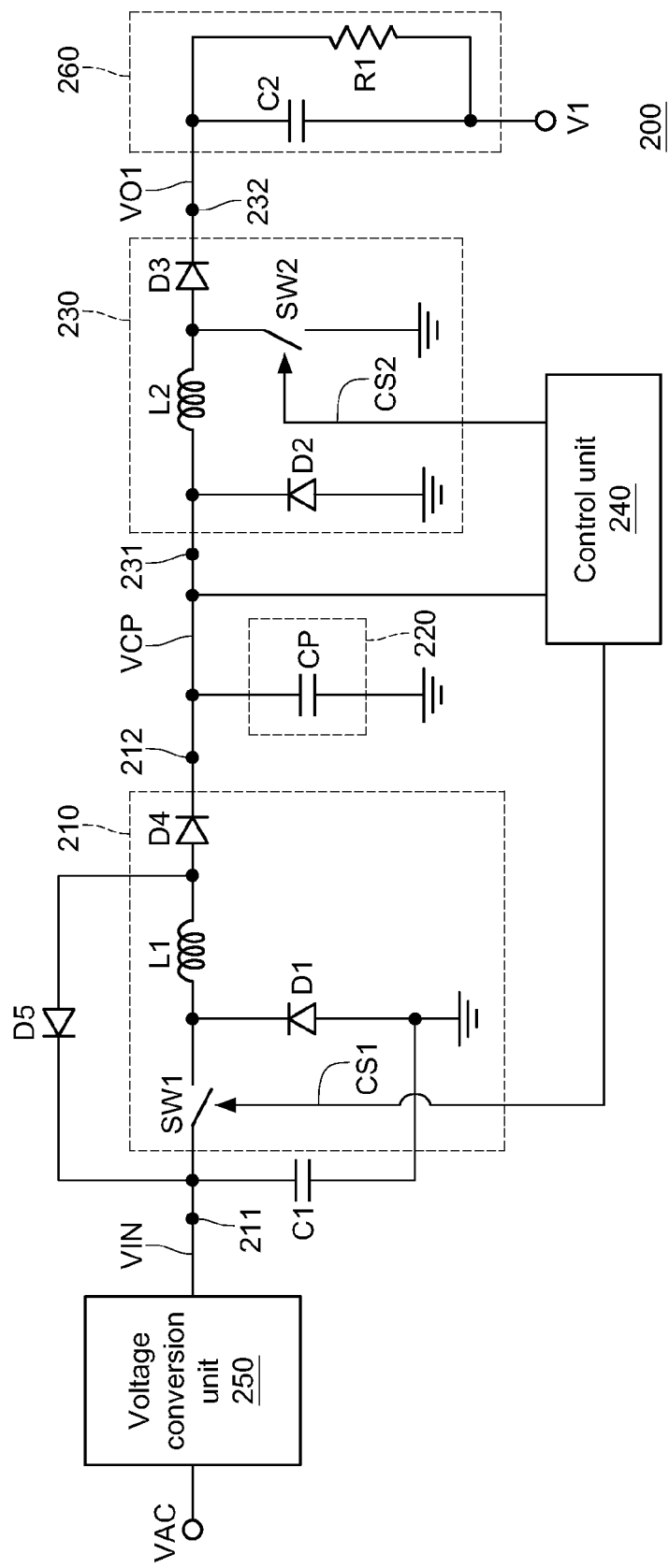
FIG. 2 is a circuit diagram of a power-factor-corrected resonant converter according to a second embodiment of the disclosure.

FIG. 2 is a circuit diagram of a power-factor-corrected resonant converter according to a second embodiment of the disclosure. The power-factor-corrected converter 200 is also called a power-factor-corrected LC-LC converter. The power-factor-corrected resonant converter 200 comprises a power-obtaining circuit 210, an energy-storage element 220, an energy-transferred circuit 230, a diode D5, a capacitor C1, a control unit 240, a voltage conversion unit 250 and a load unit 260. In this embodiment, operations of the power-obtaining circuit 210, the energy-storage element 220 and the energy-transferred circuit 230 may be referred to the power-obtaining circuit 110, the energy-storage element 120 and the energy-transferred circuit 130 of the embodiment in FIG. 1, and thus they will not be mentioned herein again.

The power-obtaining circuit 210 has an input end 211 and an output end 212. The power-obtaining circuit 210 comprises a switch SW1 (corresponding to the first switch of the power-obtaining circuit 110 in the first embodiment), diodes D1 (corresponding to the first diode of the power-obtaining circuit 110 in the first embodiment) and D4 (corresponding to the fourth diode of the power-obtaining circuit 110 in the first embodiment) and an inductor L1 (corresponding to the first inductor of the power-obtaining circuit 110 in the first embodiment). A first end of the switch SW1 is coupled to the input end 211 of the power-obtaining circuit 210. The switch SW1 is controlled by the control signal CS1 to be in conduction during a first time period and disconnected during a second time period. An anode terminal of the diode D1 is coupled to the ground and a cathode terminal of the diode D1 is coupled to a second end of the switch SW1. A first end of the inductor L1 is coupled to the second end of the switch SW1.

An anode terminal of the diode D4 is coupled to a second end of the inductor L1 and a cathode terminal of the diode D4 is coupled to the output end 212 of the power-obtaining circuit 210. That is, the diode D4 is positioned between the second end of the inductor L1 and the output end 212 of the power-obtaining circuit 210. In another embodiment, the diode D4 can be omitted. That is, the power-obtaining circuit 210 only comprises the inductor L1, the switch SW1 and the diode D1. The second end of the inductor L1 is coupled to the output end 212 of the power-obtaining circuit 210 in order to save the usage cost of the circuit elements. Furthermore, the same effect can be achieved with the diode D4 or without the diode D4.

In this embodiment, the energy-storage element 220 can comprise a capacitor CP. A first end of the capacitor CP is a first end of the energy-storage element 220, a second end of the capacitor CP is a second end of the energy-storage element 220. That is, the energy-storage element 220 is implemented by only one capacitor. In another embodiment, the energy-storage element 220 may comprise a plurality of capacitors. First ends of the capacitors are coupled to each other and second ends of the capacitors are coupled to each other. That is, the energy-storage element 220 is implemented by connecting in parallel a plurality of the capacitors. The number of the capacitors can be adjusted according to the requirements of a user.

Figure 3:
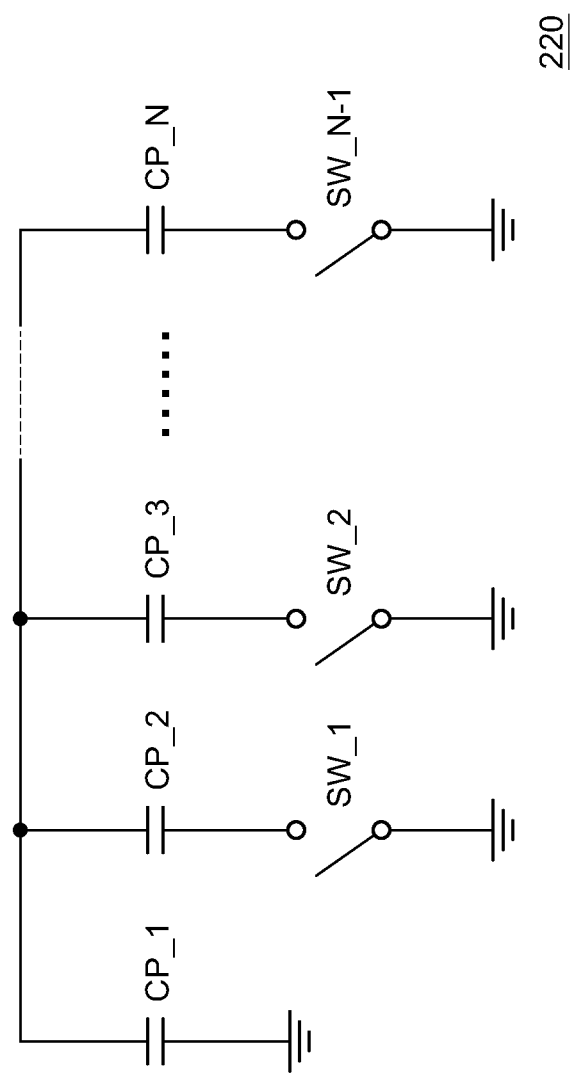
FIG. 3 is an illustration of an energy-storage element according to a third embodiment of the disclosure.

Furthermore, the energy-storage element 220 can also be implemented by programmable controlling as shown in FIG. 3. FIG. 3 is an illustration of the energy-storage element according to a third embodiment of the disclosure. The energy-storage element 220 comprises a plurality of capacitors CP_1 to CP_N and a plurality of switches SW_1 to SW_N−1, wherein N is a positive integer which is greater than 1. The relationships between the capacitors CP_1 to CP_N and the switches SW_1 to SW_N−1 can be referred to FIG. 3 and thus they will not be mentioned herein. The switches can be controlled to be in conduction or disconnected by programmable controlling, and therefore the energy-storage element 220 is implemented by one capacitor or a plurality of capacitors connected in parallel.

An anode terminal of the diode D5 (the fifth diode) is coupled to the second end of the inductor L1 and a cathode terminal of the diode D5 is coupled to the first end of the switch SW1. A first end of the capacitor C1 is coupled to the first end of the switch SW1 and a second end of the capacitor C1 is coupled to the anode terminal of the diode D1.

The energy-transferred circuit 230 comprises an inductor L2 (corresponding to the second inductor of the energy-transferred circuit 130 in the first embodiment), a switch SW2 (corresponding to the second switch of the energy-transferred circuit 130 in the first embodiment) and diodes D2 and D3 (corresponding to the second and third diodes of the energy-transferred circuit 130 in the first embodiment). A first end of the inductor L2 is coupled to an input end 231 of the energy-transferred circuit 230. A first end of the switch SW2 is coupled to a second end of the inductor L2, and a second end of the switch SW2 is coupled to the ground. The switch SW2 is controlled by the control signal CS2 to be disconnected at a first time period and in conduction at a second time period. An anode terminal of the diode D2 is coupled to the ground and a cathode terminal of the diode D2 is coupled to the input end 231 of the energy-transferred circuit 230. An anode terminal of the diode D3 is coupled to the first end of the switch SW2 and a cathode terminal of the diode D3 is coupled to an output end 232 of the energy-transferred circuit 230.

The control unit 240 coupled to the first end of the energy-storage element 220 is used for detecting the voltage level of the energy-storage voltage VCP and generating the control signal CS1 during the first time period and the control signal CS2 during the second time period based on the voltage level of the energy-storage voltage VCP. The controls signal CS1 and the control signal CS2 are complementary to each other.

For example, when the control unit 240 detects that the voltage level of the energy-storage voltage VCP is 0V by, the control signal CS1 with high logic level is provided for conducting the switch SW1, and the control signal CS2 with low logic level is provided for disconnecting the switch SW2.

When the control unit 240 detects that the voltage level of the energy-storage voltage VCP is the same as the input line voltage VIN, the control signal CS1 with low logic level is provided for disconnecting the switch SW1, and the control signal CS2 with high logic level is provided for conducting the switch SW2. The voltage conversion unit 250 coupled to the input end 211 of the power-obtaining circuit 210 is used for receiving an alternating voltage VAC and converting the alternating voltage VAC into the input line voltage VIN.

A first end of the load unit 260 is coupled to the output end 232 of the energy-transferred circuit 230, and a second end of the load unit 260 is coupled to a voltage V1. In an embodiment, the voltage V1 may be the energy-storage voltage VCP. In this case, the second end of the load unit 260 is coupled to the first end of the energy-storage element 220. In another embodiment, the voltage V1 may be a ground voltage. In this case, the second end of the load unit 260 is coupled to the ground. The load unit 260 comprises a capacitor C2 and a resistor R1. A first end of the capacitor C2 is coupled to the output end 232 of the energy-transferred circuit 230, and a second end of the capacitor C2 is coupled to the first end of the energy-storage element 220. A first end of the resistor R1 is coupled to the first end of the capacitor C2, and a second end of the resistor R1 is coupled to the second end of the capacitor C2.

The internal elements of the 200 and their relationships are described briefly above. The operation of the power-factor-corrected resonant converter 200 will be described below. It is assumed that the energy-storage voltage VCP is equal to the input line voltage VIN during the operation of the power-factor-corrected resonant converter 200.

Firstly, the alternating voltage VAC is converted and rectified by the voltage conversion unit 250 to provide the input line voltage VIN. At this point, the control unit 240 detects that the energy-storage voltage VCP is 0V. Therefore, the control signal CS1 with high logic level and the control signal CS2 with low logic level are provided respectively to conduct the switch SW1 and disconnect the switch SW2. Because the switch SW1 is in conduction, a resonant circuit is formed by the inductor L1 of the power-obtaining circuit 210 and the capacitor CP of the energy-storage element 220. Based on a soft switching operation of the inductor L1, the diode D1, the diode D4 and the switch SW1 of the power-obtaining circuit 210, the capacitor CP of the energy-storage element 220 is charged with the input line voltage VIN and the input line power is obtained, so that the voltage of the energy-storage voltage VCP rises continuously.

When the control unit 240 detects that the voltage level of the energy-storage voltage VCP rises to be equal to the input line voltage VIN, the control signal CS1 with low logic level and the control signal CS2 with high logic level are provided for disconnecting the switch SW1 and conducting the switch SW2. Because the switch SW2 is in conduction, another resonant circuit is formed by the capacitor CP of the energy-storage element 220 and the inductor L2 of the energy-transferred circuit 230. The capacitor CP of the energy-storage element 220 is discharged so that the electric charge stored in the capacitor CP of the energy-storage element 220 is converted into magnetic energy, and the magnetic energy is stored in the inductor L2 of the energy-transferred circuit 230.

When the control unit 240 detects that the voltage of the capacitor CP reduces to 0V, the switch SW2 is disconnected and the energy-storage voltage VCP stored in the energy-transferred circuit 230 is converted into electric energy to be transferred to the output power VO1. In other words, based on the soft switching operation of the inductor L2, the diodes D2 and D3 and the switch SW2 of the energy-transferred circuit 230, the capacitor CP of the energy-storage element 220 is discharged and energy is transferred, so that the energy-storage voltage VCP is converted into the output power VO1 and the energy of the output power VO1 is transferred to the load unit 260. After finishing discharging the magnetic energy of the inductor L2, the aforementioned operations will be repeated when the switch SW1 is in conduction conducted in the next switching cycle (at this time, the voltage level of the energy-storage voltage VCP is 0V and the switch SW2 is disconnected).

On the other hand, after the switch SW1 is disconnected, a part of the energy stored in the inductor L1 is recycled by using the lossless-recycling technique through the paths formed by the diodes D1 and D5, so that the conversion efficiency of the power-factor-corrected resonant converter 200 can be enhanced.

In this embodiment, the input line power can be obtained and energy can be transferred by soft switching operations of the two resonant circuits. Thus, an output voltage or current may be adjusted and a better power factor can be obtained. The following example will illustrate how the power-factor-corrected resonant converter obtains a better power factor.

Firstly, energy transfer can be achieved by charging and discharging the capacitor CP. The charge quantity of the capacitor CP can be obtained by formula (1).

$$\Delta Q = I \times \Delta t = C_p \times \Delta V \tag{1}$$

Wherein $\Delta Q$ is the charge quantity of the capacitor CP, I is a current flowing through the capacitor CP, $\Delta t$ is a charging time of the capacitor CP, $C_p$ is a capacitance of the capacitor CP, $\Delta V$ is a voltage difference for charging and discharging of the capacitor CP. Furthermore, $\Delta V$ is also equal to an input line voltage detected in each switching cycle. $\Delta V$ may be represented by formula (2).

Then, an average current $I_{SW1,avg}(t)$ flowing through the capacitor CP during a conduction period of the switch SW1 is calculated by formula (4) based on formulas (1), (2) and (3).

$$\Delta V = V_{peak} \times |\sin \omega t| \tag{2}$$

When $\Delta t = T1$, $$I_{SW1}(t) \sim \frac{C_P \times \Delta V}{\Delta t} = \frac{C_P}{T1} \times V_{peak} \times |\sin \omega t| \tag{3}$$

$$I_{SW1,avg}(t) = I_{SW1}(t) \times \frac{T1}{T_{SW}} = \frac{C_P}{T_{SW}} \times V_{peak} \times |\sin \omega t| \tag{4}$$

Wherein $V_{peak}$ is a peak voltage of the input line voltage VIN, T1 is a conduction time of the switch SW1, $I_{SW1}(t)$ is a current flowing through the capacitor CP when the switch SW1 is in conduction, and $T_{SW}$ is a switching cycle of the switch SW1.

According to the formula (4), it is indicated that $$\frac{C_P}{T_{SW}}$$

is a constant, and a reciprocal of the value can be equivalent to a resistive value. Furthermore, it can be known that $I_{SW1,avg}(t)$ is in direct proportion to $|\sin \omega t|$, and a sinusoidal waveform which is the same as that of the alternating voltage VAC can be obtained as shown in FIG. 4.

Figure 4:
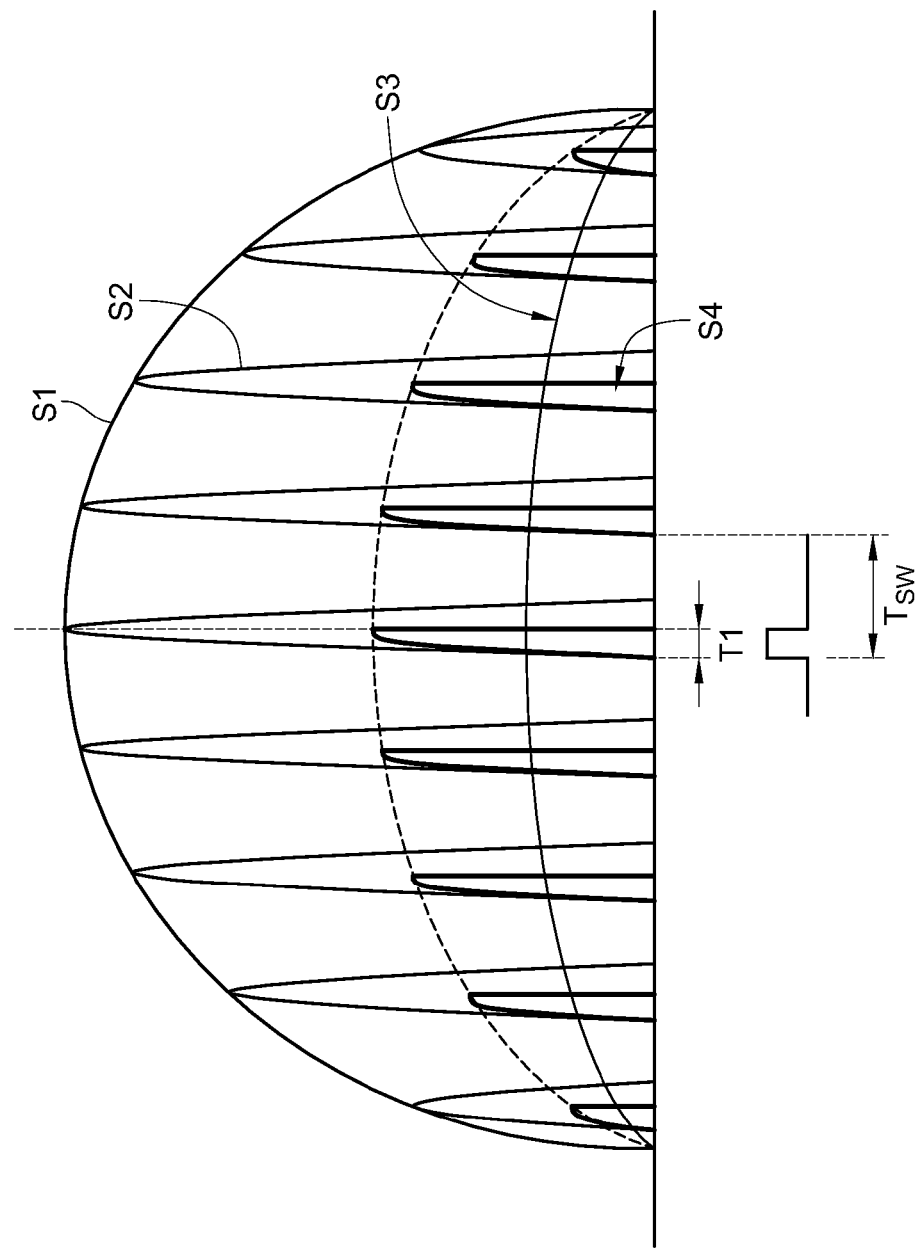
FIG. 4 is a waveform diagram for a power-factor-corrected resonant converter according to a fourth embodiment of the disclosure.

FIG. 4 is a waveform diagram for the power-factor-corrected resonant converter according to a fourth embodiment of the disclosure. A curve S1 is the input line voltage VIN, a curve S2 is the energy-storage voltage VCP, a curve S3 is the average current $I_{SW1,avg}(t)$ flowing through the capacitor CP during a conduction period of the switch SW1, a curve S4 is the current $I_{SW1}(t)$ flowing through the capacitor CP when the switch SW1 is in conduction, $T_{SW}$ is the switching cycle of the switch SW1, T1 is the conduction time of the switch SW1. As indicated in FIG. 4, the sinusoidal waveform of $I_{SW1,avg}(t)$ (the curve S3) is similar to that of the input line voltage VIN (the curve S1). Therefore, in this embodiment, the power-factor-corrected resonant converter 200 can get a good power factor.

Furthermore, in this embodiment, the voltage level of the energy-storage voltage VCP in the capacitor CP at most is the same as the alternating voltage VAC, and therefore the switches SW1 and SW2 can be implemented by employing elements which have a lower withstand voltage. In addition, switches SW1 and SW2 can operate a soft switching in order to effectively reduce switch loss and interference of high frequency noise. Additionally, small sized capacitor CP and inductors L1 and L2 can be employed in order to reduce volumes of the circuit elements.

Furthermore, assume that the energy-storage voltage VCP is equal to two times of the input line voltage VIN. At this point, the diode D5 can be omitted in the power-factor-corrected resonant converter 200. That is, the power-factor-corrected resonant converter 200 does not require the lossless-recycling technique through the path formed by the diode D5. When the control unit 240 detects that the current of the inductor L1 is discharged to zero or the energy-storage voltage VCP in the capacitor CP is equal to two times of the input line voltage VIN, the switch SW1 is controlled to be disconnected. In other words, in the first time period, based on the control signal CS1, the energy-storage element 220 and the power-obtaining circuit 210 operate a soft switching through the inductor L1, the diodes D1 and D2 and the switch SW1 of the power-obtaining circuit 210, so that the capacitor CP of the energy-storage element 220 is charged with the input line voltage VIN in order to generate the energy-storage voltage VCP and to obtain the input line power. At this point, the energy-storage voltage VCP in the capacitor CP is charged to be equal to two times of the input line voltage VIN.

Then, the control unit 240 controls the switch SW2 to be in conduction. In other words, in the second time period, based on the control signal CS2, the energy-storage element 220 and the energy-transferred circuit 230 operates a soft switching through the inductor L2, the diodes D2 and D3 and switch SW2 of the energy-transferred circuit 230, so that the energy-storage element 220 is discharged. The energy is transferred so as to convert the energy-storage voltage VCP into the output power VO1. Then, the energy of the output power VO1 is transferred to the load unit 260 so that the output voltage or current can be adjusted.

In this embodiment, the input line voltage VIN may be but not limited to be an alternating voltage. The input line voltage VIN can also be a direct voltage.

Figure 5:
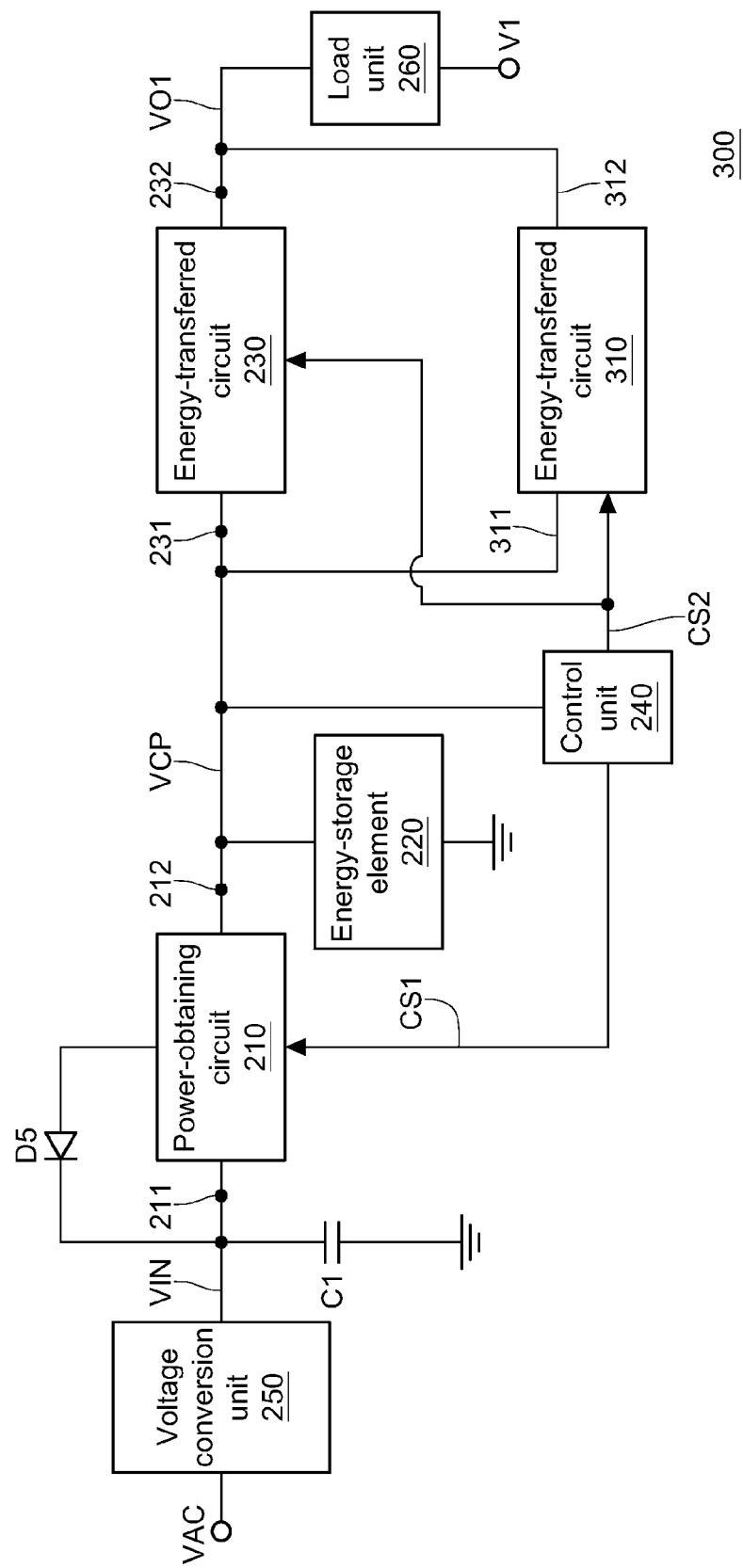
FIG. 5 is a circuit diagram of a power-factor-corrected resonant converter according to a fifth embodiment of the disclosure.

FIG. 5 is a circuit diagram of the power-factor-corrected resonant converter according to a fifth embodiment of the disclosure. The power-factor-corrected resonant converter 300 in this embodiment is also called a power-factor-corrected LC-LC converter. The power-factor-corrected resonant converter 300 comprises the power-obtaining circuit 210, the energy-storage element 220, the energy-transferred circuit 230, the diode D5, the capacitor C1, the control unit 240, the voltage conversion unit 250 and the load unit 260 which are same as those in FIG. 2. The operations and the relationships of the elements can be referred to the descriptions of the embodiment in FIG. 2, and thus they will not be mentioned herein again.

In this embodiment, the power-factor-corrected resonant converter 300 further comprises an energy-transferred circuit 310. The energy-transferred circuit 310 has an input end 311 and an output end 312. The input end 311 of the energy-transferred circuit 310 is coupled to the input end 231 of the energy-transferred circuit 230, and the output end 312 of the energy-transferred circuit 310 is coupled to the output end 232 of the energy-transferred circuit 230. The energy-transferred circuit 310 comprises a third inductor, a sixth diode, a seventh diode and a third switch.

In the second time period, based on the control signal CS2, the energy-storage element 220 and the energy-transferred circuit 310 operate a soft switching through the third inductor, the sixth diode, the seventh diode and the third switch of the energy-transferred circuit 310, so that the energy-storage element 220 is discharged. The energy is transferred to convert the energy-storage voltage VCP into the output power VO1, and the output power VO1 is transferred to the load unit 260.

The internal elements of the energy-transferred circuit 310 (the third inductor, the sixth diode, the seventh diode and the third switch) and their relationships can be referred to those of the energy-transferred circuit 230 in FIG. 2 (the inductor L2, the diodes D2 and D3 and the switch SW2), and thus they will not be mentioned herein again. The energy-transferred circuit 310 and the energy-transferred circuit 230 are connected in parallel for providing an output power with high watts to the load unit 260.

Furthermore, although only one energy-transferred circuit 310 is illustrated in the embodiment where the energy-transferred circuit 310 and the energy-transferred circuit 230 are connected in parallel, the disclosure is not limited to this embodiment. The power-factor-corrected resonant converter 300 can further comprise a plurality of the energy-transferred circuits 310 and they are connected with the energy-transferred circuit 230 in parallel for providing an output power with high watts. Furthermore, the second diode and the sixth diode of the energy-transferred circuits 230 and 310 can be implemented with only one diode. That is, one of the second diode and the sixth diode can be omitted.

Figure 6:
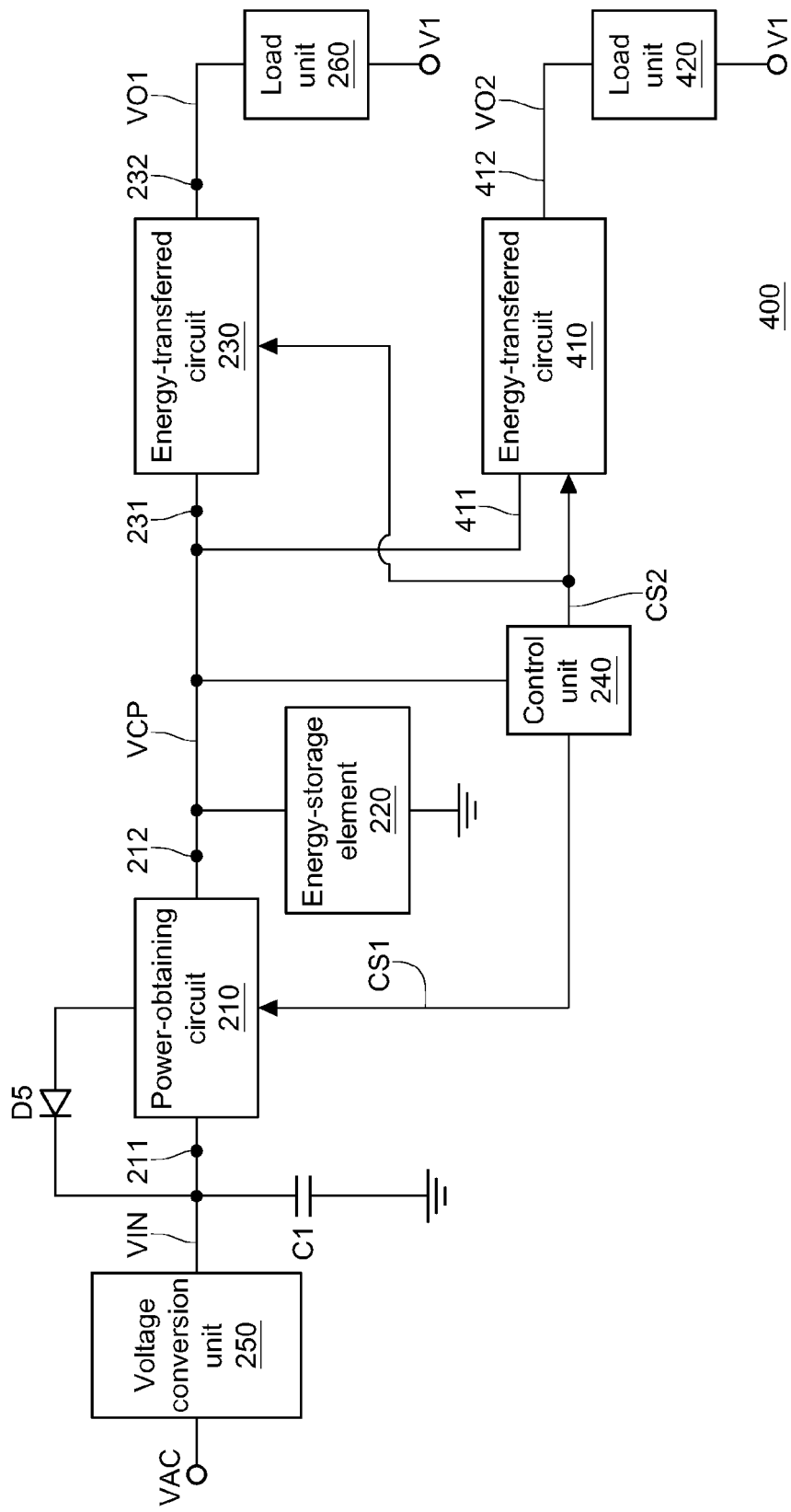
FIG. 6 is a circuit diagram of a power-factor-corrected resonant converter according to a sixth embodiment of the disclosure.

FIG. 6 is a circuit diagram of the power-factor-corrected resonant converter according to a sixth embodiment of the disclosure. The power-factor-corrected resonant converter 400 in this embodiment is also called a power-factor-corrected LC-LC converter. The power-factor-corrected resonant converter 400 comprises the power-obtaining circuit 210, the energy-storage element 220, the energy-transferred circuit 230, the diode D5, the capacitor C1, the control unit 240, the voltage conversion unit 250 and the load unit 260 which are the same as those in FIG. 2. The operations and the relationships of the elements can be referred to the descriptions of the embodiment in FIG. 2, and thus they will not be mentioned herein again.

In this embodiment, the power-factor-corrected resonant converter further comprises an energy-transferred circuit 410 and a load unit 420. The energy-transferred circuit 410 has an input end 411 and an output end 412. The input end 411 of the energy-transferred circuit 410 is coupled to the input end 231 of the energy-transferred circuit 230, and an output power VO2 is generated by the output end 412 of the energy-transferred circuit 410. The energy-transferred circuit 410 comprises a fourth inductor, an eighth diode, a ninth diode and a fourth switch.

In the second time period, based on the control signal CS2, the energy-storage element 220 and the energy-transferred circuit 410 operate a soft switching through the fourth inductor, the eighth diode, the ninth diode and the fourth switch of the energy-transferred circuit 410, so that the energy-storage element 220 is discharged. The energy is transferred to convert the energy-storage voltage VCP into the output power VO1, and the output power VO1 is transferred to the load unit 420.

A first end of the load unit 420 is coupled to the output end 412 of the energy-transferred circuit 410, and a second end of the load unit 420 is coupled to a voltage V1. In an embodiment, the voltage V1 may be the energy-storage voltage VCP. In this case, the second end of the load unit 420 is coupled to the first end of the energy-storage element 220. In another embodiment, the voltage V1 can be a ground voltage. In this case, the second end of the load unit 420 is coupled to the ground.

The internal elements (the fourth inductor, the eighth diode, the ninth diode and the fourth switch) of the energy-transferred circuit 410 and their relationships may be referred to those of the energy-transferred circuit 230 in FIG. 2 (the inductor L2, the diodes D2 and D3 and the switch SW2), and thus they will not be mentioned herein again. The energy-transferred circuit 410 and the energy-transferred circuit 230 are connected in parallel, and the energy-transferred circuit 230 and the energy-transferred circuit 410 are coupled respectively to the load units 260 and 420 for providing operating voltages required by the load units.

Furthermore, only one set of the energy-transferred circuit 410 and the load unit 420 is illustrated in the embodiment where the energy-transferred circuit 410 and the energy-transferred circuit 230 are connected in parallel and the load unit 420 is connected with the energy-transferred circuit 410, but the disclosure is not limited to this embodiment. The power-factor-corrected resonant converter 400 can further comprise a plurality of the energy-transferred circuits 410 and load units 420, and the energy-transferred circuits 410 are connected with the energy-transferred circuit 230 in parallel. Each of the load units 420 is coupled to the corresponding energy-transferred circuits 410 for providing operating voltages and output powers required by different load units. Furthermore, the second diode and the eighth diode of the energy-transferred circuits 230 and 410 can be implemented with only one diode. That is, one of the second diode and the eighth diode can be omitted.

Figure 7:
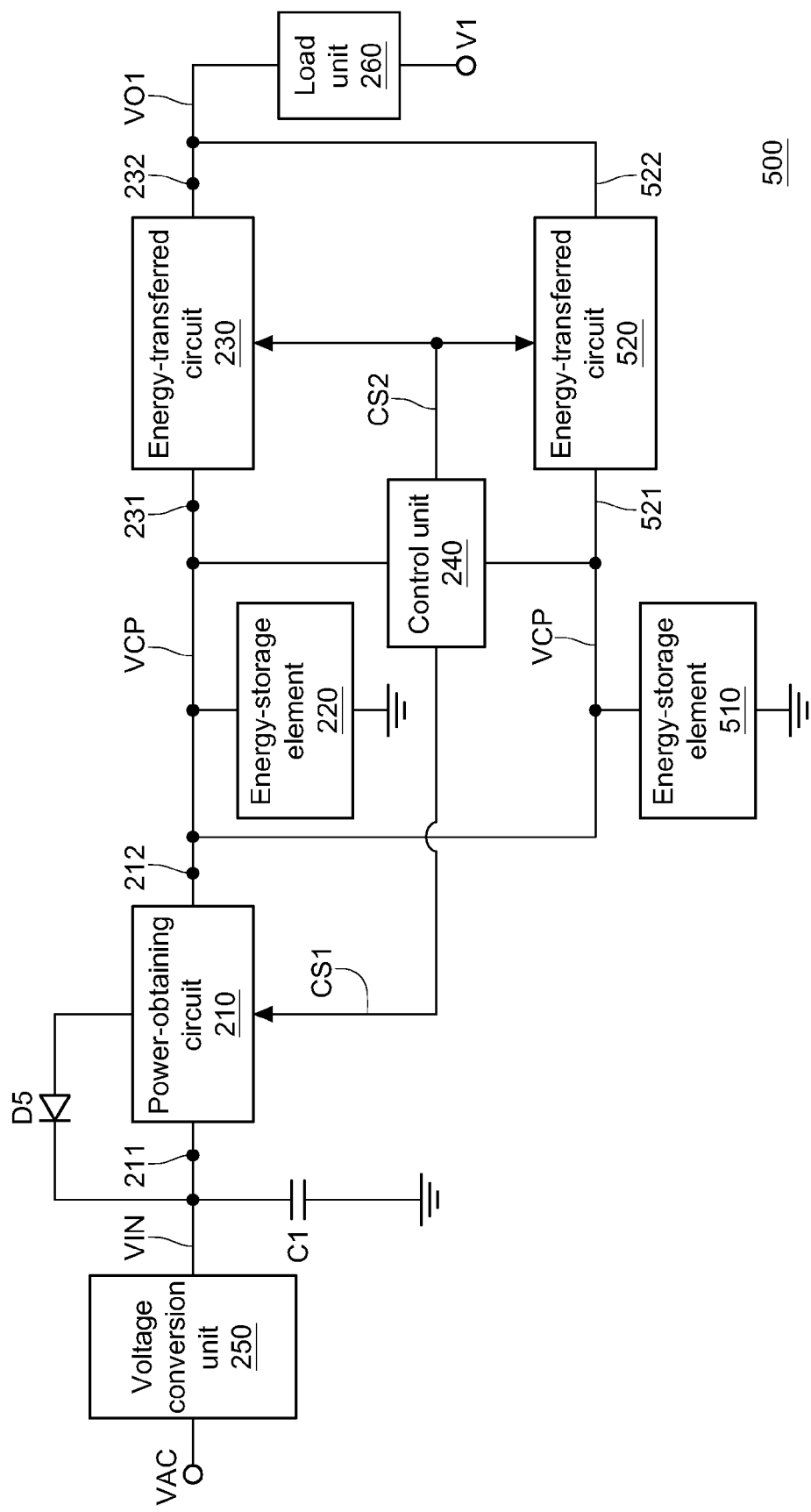
FIG. 7 is a circuit diagram of a power-factor-corrected resonant converter according to a seventh embodiment of the disclosure.

FIG. 7 is a circuit diagram of the power-factor-corrected resonant converter according to a seventh embodiment of the disclosure. The power-factor-corrected resonant converter 500 in this embodiment is also called a power-factor-corrected LC-LC converter. The power-factor-corrected resonant converter 500 comprises the power-obtaining circuit 210, the energy-storage element 220, the energy-transferred circuit 230, the diode D5, the capacitor C1, the control unit 240, the voltage conversion unit 250 and the load unit 260 which are the same as those in FIG. 2. The operations and the relationships of the elements can be referred to the descriptions of the embodiment in FIG. 2 and thus they will not be mentioned herein again.

In this embodiment, the power-factor-corrected resonant converter 500 further comprises an energy-storage element 510 and an energy-transferred circuit 520. A first end of the energy-storage element 510 is coupled to the output end 212 of the power-obtaining circuit 210, and a second end of the energy-storage element 510 is coupled to the ground. The energy-transferred circuit 520 has an input end 521 and an output end 522. The input end 521 of the energy-transferred circuit 520 is coupled to the first end of the energy-storage element 510, and the output end 522 of the energy-transferred circuit 520 is coupled to the output end 232 of the energy-transferred circuit 230. The energy-transferred circuit 520 comprises a fifth inductor, a tenth diode, an eleventh diode and a fifth switch.

In the first time period, based on the control signal CS1, the energy-storage elements 220 and 510 and the power-obtaining circuit 210 operate a soft switching respectively through the first inductor, the first diode, the fourth diode and the first switch of the power-obtaining circuit 210, so that the energy-storage elements 220 and 510 are charged with the input line voltage VIN in order to generate the energy-storage voltage VCP and obtain the input line power. In the second time period, based on the control signal CS2, the energy-storage elements 220 and 510 respectively operates a soft switching with the energy-transferred circuit 520 through the fifth inductor, the tenth diode, the eleventh diode and the fifth switch of the energy-transferred circuit 520, so that the energy-storage elements 220 and 510 are enabled to be discharged. The energy is transferred to convert the energy-storage voltage VCP into the output power VO1, and the output power VO1 is transferred to the load unit 260.

The internal elements of the energy-transferred circuit 520 (the fifth inductor, the tenth diode, the eleventh diode and the fifth switch) and their relationships may be referred to those of the energy-transferred circuit 230 in FIG. 2 (the inductor L2, the diodes D2 and D3 and the switch SW2), and thus they will not be mentioned herein again. The energy-transferred circuit 520 and the energy-transferred circuit 230 are connected in parallel for providing an output power with high watts to the load unit 260.

Furthermore, only one combinational circuit of the energy-storage element 510 and the energy-transferred circuit 520 is illustrated in the embodiment where the combinational circuit and the energy-transferred circuit 230 are connected in parallel, but the disclosure is not limited to this embodiment. The power-factor-corrected resonant converter 500 can further comprise a plurality of combinational circuits comprising the energy-storage elements 510 and the energy-transferred circuits 520, and each of the combinational circuits is connected with the combinational circuit of the energy-storage element 220 and the energy-transferred circuit 230 in parallel for providing an output power with higher watts. Furthermore, the second diode and the tenth diode of the energy-transferred circuits 230 and 520 can be embodied with only one diode. That is, one of the second diode and the tenth diode can be omitted.

Figure 8:
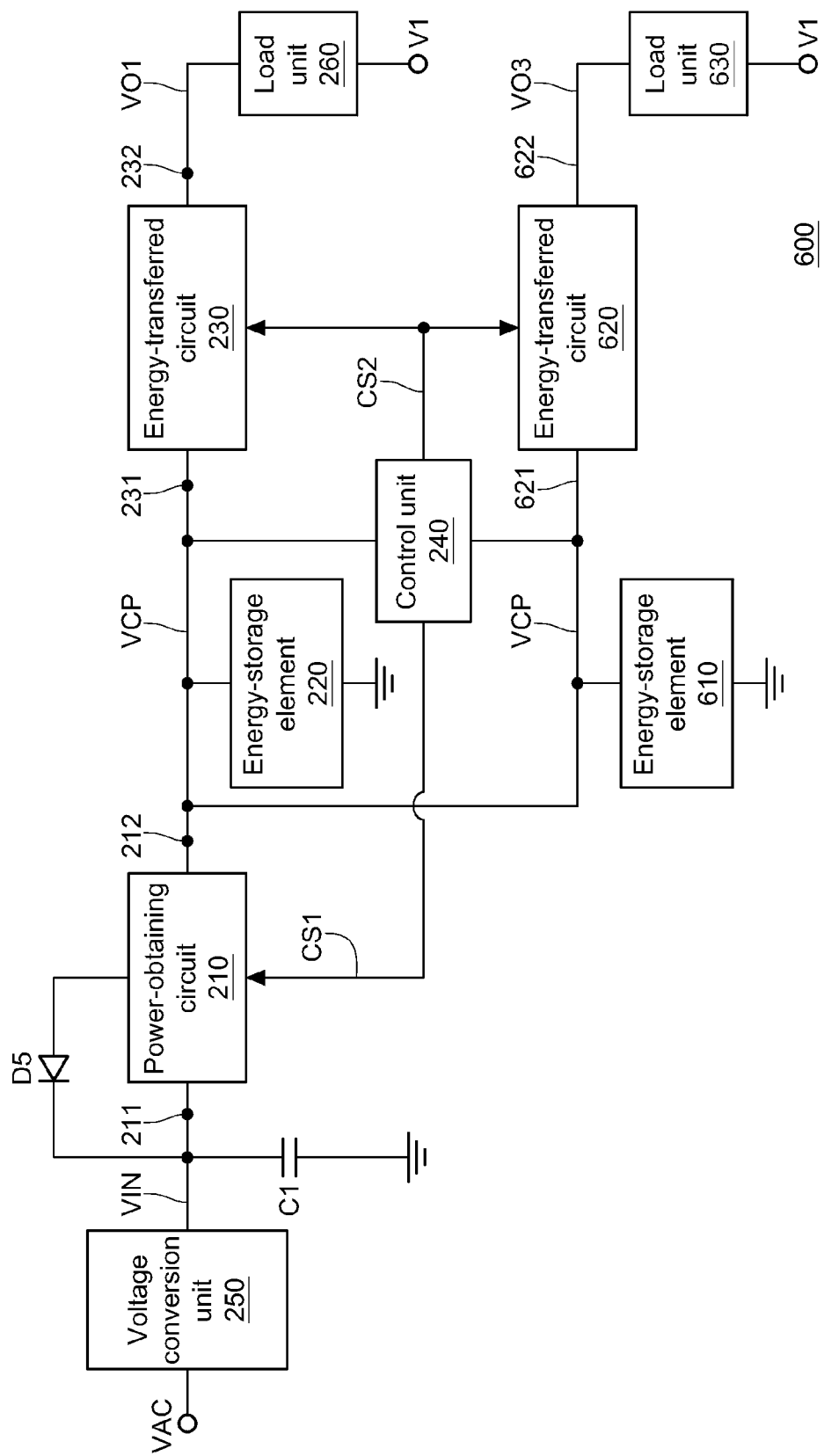
FIG. 8 is a circuit diagram of a power-factor-corrected resonant converter according to an eighth embodiment of the disclosure.

FIG. 8 is a circuit diagram of the power-factor-corrected resonant converter according to an eighth embodiment of the disclosure. The power-factor-corrected resonant converter 600 in this embodiment is also called a power-factor-corrected LC-LC converter. The power-factor-corrected resonant converter 600 comprises the power-obtaining circuit 210, the energy-storage element 220, the energy-transferred circuit 230, the diode D5, the capacitor C1, the control unit 240, the voltage conversion unit 250 and the load unit 260 which are the same as those in FIG. 2. The operations and the relationships of the elements can be referred to the descriptions of the embodiment in FIG. 2, and thus they will not be mentioned herein again.

The power-factor-corrected resonant converter 600 further comprises an energy-storage element 610, an energy-transferred circuit 620 and a load unit 630. A first end of the energy-storage element 610 is coupled to the output end 212 of the power-obtaining circuit 210, and a second end of the energy-storage element 610 is coupled to the ground. The energy-transferred circuit 620 has an input end 621 and an output end 622. The input end 621 of the energy-transferred circuit 620 is coupled to the first end of the energy-storage element 610, and the output end 622 of the energy-transferred circuit 620 generates an output power V03. The energy-transferred circuit 620 comprises a sixth inductor, a twelfth diode, a thirteenth diode and a sixth switch.

In the first time period, based on the control signal CS1, the energy-storage elements 220 and 610 respectively operates a soft switching with the power-obtaining circuit 210 through the first inductor, the first diode, the fourth diode and the first switch of the power-obtaining circuit 210, so that the energy-storage elements 220 and 610 are charged with the input line voltage VIN in order to generate the energy-storage voltage VCP and obtain the input line power.

In the second time period, based on the control signal CS2, the energy-storage elements 220 and 610 respectively operates a soft switching with the energy-transferred circuit 620 through the sixth inductor, the twelfth diode, the thirteenth diode and the sixth switch of the energy-transferred circuit 620, so that the energy-storage elements 220 and 610 are discharged. The energy is transferred to convert the energy-storage voltage VCP into the output powers VO1 and V03, and the output powers VO1 and VO3 are respectively transferred to load units 260 and 630.

A first end of the load unit 630 is coupled to the output end 622 of the energy-transferred circuit 620, and a second end of the load unit 630 is coupled to the voltage V1. In an embodiment, the voltage V1 may be the energy-storage voltage VCP. In this case, the second end of the load unit 630 is coupled to the first end of the energy-storage element 610. In another embodiment, the voltage V1 can be a ground voltage. In this case, the second end of the load unit 630 is coupled to the ground.

The internal elements of the energy-transferred circuit 620 (the sixth inductor, the twelfth diode, the thirteenth diode and the sixth switch) and their relationships can be referred to those of the energy-transferred circuit 230 in FIG. 2 (the inductor L2, the diodes D2 and D3 and the switch SW2), and thus they will not be mentioned herein again. The energy-transferred circuit 620 and the energy-transferred circuit 230 are connected in parallel, and energy-transferred circuits 230 and 620 are coupled to the load units 260 and 630 respectively for providing operating voltages for different load units. Additionally, only one combinational circuit of the energy-storage element 610, the energy-transferred circuit 620 and the load unit 630 is illustrated in the embodiment, and the combinational circuit is connected in parallel with the combinational circuit of the energy-storage element 220, the energy-transferred circuit 230 and the load unit 260, but the disclosure is not limited to this embodiment.

The power-factor-corrected resonant converter 600 can further comprise a plurality of combinational circuits including the energy-storage element 610, the energy-transferred circuit 620 and the load unit 630, and each of the combinational circuits is connected in parallel with the combinational circuit of the energy-storage element 220, the energy-transferred circuit 230 and the load unit 260 for providing operating voltages and output powers for different load units. Furthermore, the second diode and the twelfth diode of the energy-transferred circuits 230 and 620 may be implemented with one diode. That is, one of the second diode and the twelfth diode can be omitted.

Figure 9:
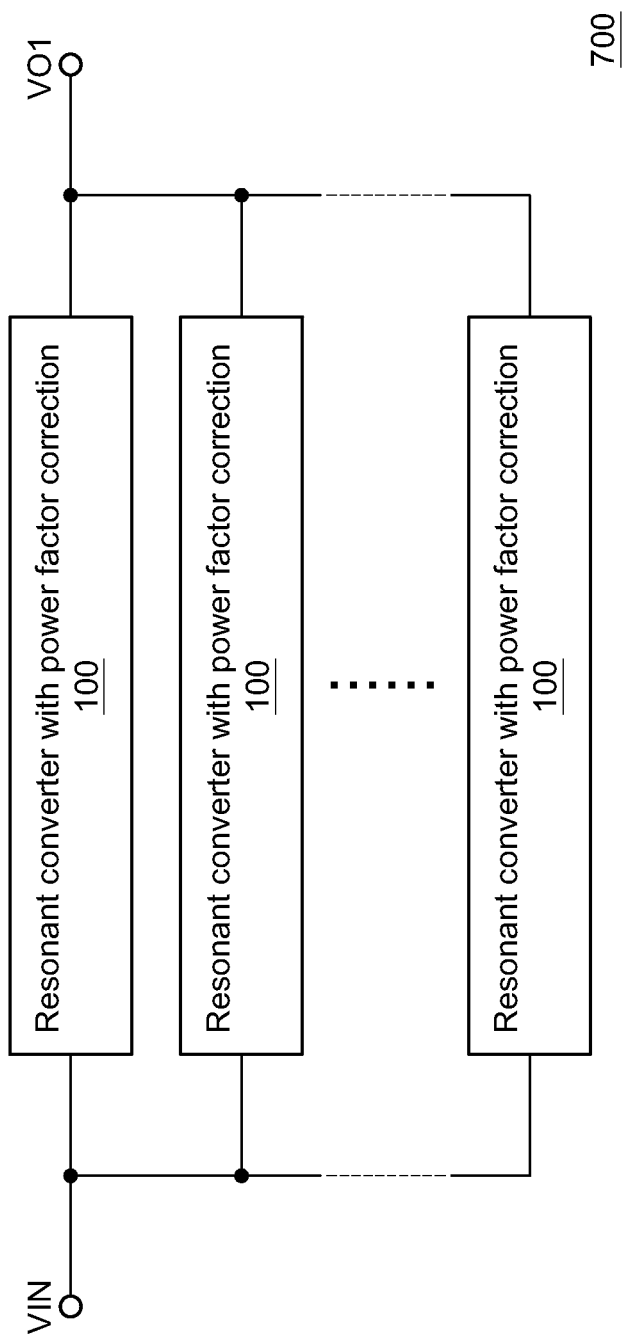
FIG. 9 is an illustration of a parallel power-factor-corrected resonant converter according to a ninth embodiment of the disclosure.

FIG. 9 is a circuit diagram of the parallel power-factor-corrected resonant converter according to a ninth embodiment of the disclosure. The parallel power-factor-corrected resonant converter 700 comprises a plurality of the power-factor-corrected resonant converters 100 as shown in FIG. 1, and the input ends and the output ends of the power-factor-corrected resonant converter are connected to each other respectively in parallel. The operations and the internal elements of each power-factor-corrected resonant converter 100 can be referred to the descriptions of the first embodiment in FIG. 1 and thus they will not be mentioned herein again. Accordingly, the parallel power-factor-corrected-resonant converter 700 in this embodiment can provide an output power with higher watts to the load end.

Figure 10:
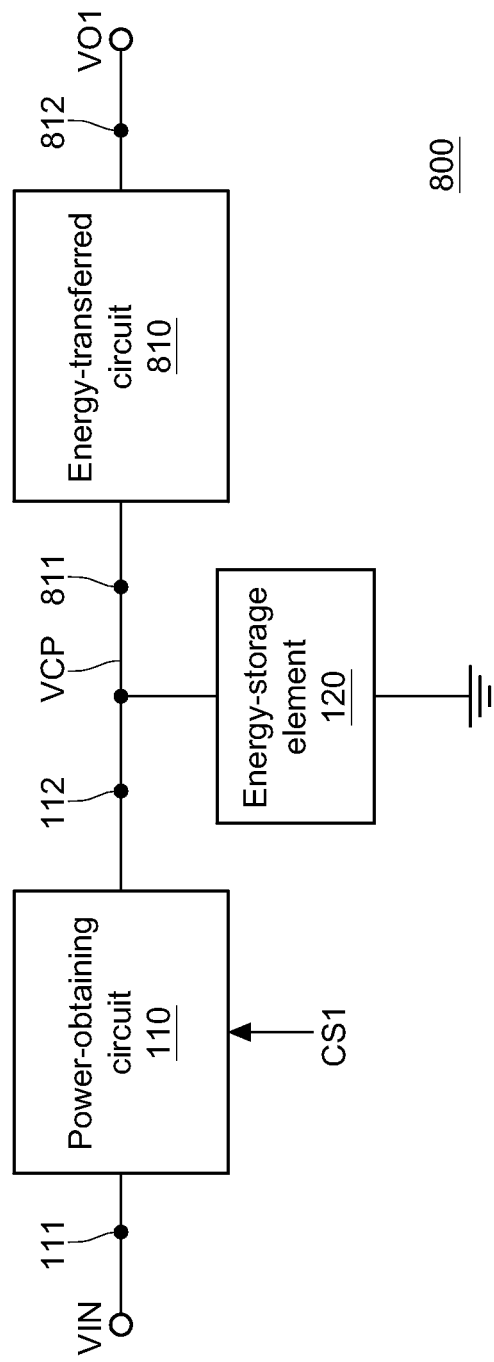
FIG. 10 is an illustration of a power-factor-corrected resonant converter according to a tenth embodiment of the disclosure.

FIG. 10 is the circuit diagram of the power-factor-corrected resonant converter according to a tenth embodiment of the disclosure. The power-factor-corrected resonant converter 800 comprises the power-obtaining circuit 110, the energy-storage element 120 and an energy-transferred circuit 810. The operations of the power-obtaining circuit 110 and the energy-storage element 120 can be referred to the descriptions of the embodiment in FIG. 1, and thus they will not be mentioned herein again. Furthermore, in an embodiment, the power-obtaining circuit 110 further omits the fourth diode. That is, and the energy-storage element 120 and the power-obtaining circuit 110 operate a soft switching through the first inductor, the first diode and the first switch of the power-obtaining circuit 110. The same effect can be achieved with the fourth diode or without the fourth diode.

The differences between this embodiment and the embodiment in FIG. 1 are that, the energy-transferred circuit 810 comprises the seventh inductor, the fourteenth diode and the fifteenth diode (e.g. they can be corresponding to the second inductor, the second diode and the third diode of the energy-transferred circuit 130), and the second switch of the energy-transferred circuit 130 is omitted. The detailed embodiment of the seventh inductor, the fourteenth diode and the fifteenth diode of the energy-transferred circuit 810 can be referred to the embodiment in FIG. 11.

In an embodiment, based on a control signal, the energy-storage element 120 and the power-obtaining circuit 110 operate a soft switching through the first inductor, the first diode, the fourth diode and the first switch of the power-obtaining circuit 110, so that the energy-storage element 120 is charged with the input line voltage VIN and the energy-storage voltage VCP is generated to obtain the input line power.

In another embodiment, based on a control signal, the energy-storage element 120 and the power-obtaining circuit 110 operate a soft switching through the first inductor, the first diode, the fourth diode and the first switch of the power-obtaining circuit 110, so that the energy-storage element 120 is charged with the input line voltage VIN and the energy-storage voltage VCP is generated to obtain the input line power. Then, when the voltage level of the input line voltage VIN is larger than the voltage level of an output end 812 of the energy-transferred circuit 810, the seventh inductor, the fourteenth diode and the fifteenth diode of the energy-transferred circuit 810 are in conduction automatically, so that the energy-storage voltage VCP is converted into the output power VO1, and the energy of the output power VO1 is outputted.

Therefore, the power-factor-corrected resonant converter 800 may reduce use of switches due to the energy-transferred circuit 810 and provide a stable output power. In addition, the output voltage and current can be adjusted and a better power factor can be obtained because of the power-factor-corrected resonant converter 800.

The relationships between the elements of the power-factor-corrected resonant converter 800 and their related operations are described briefly above. The following example will illustrate the coupling ways for the seventh inductor, the fourteenth diode and the fifteenth diode of the energy-transferred circuit 810.

Figure 11:
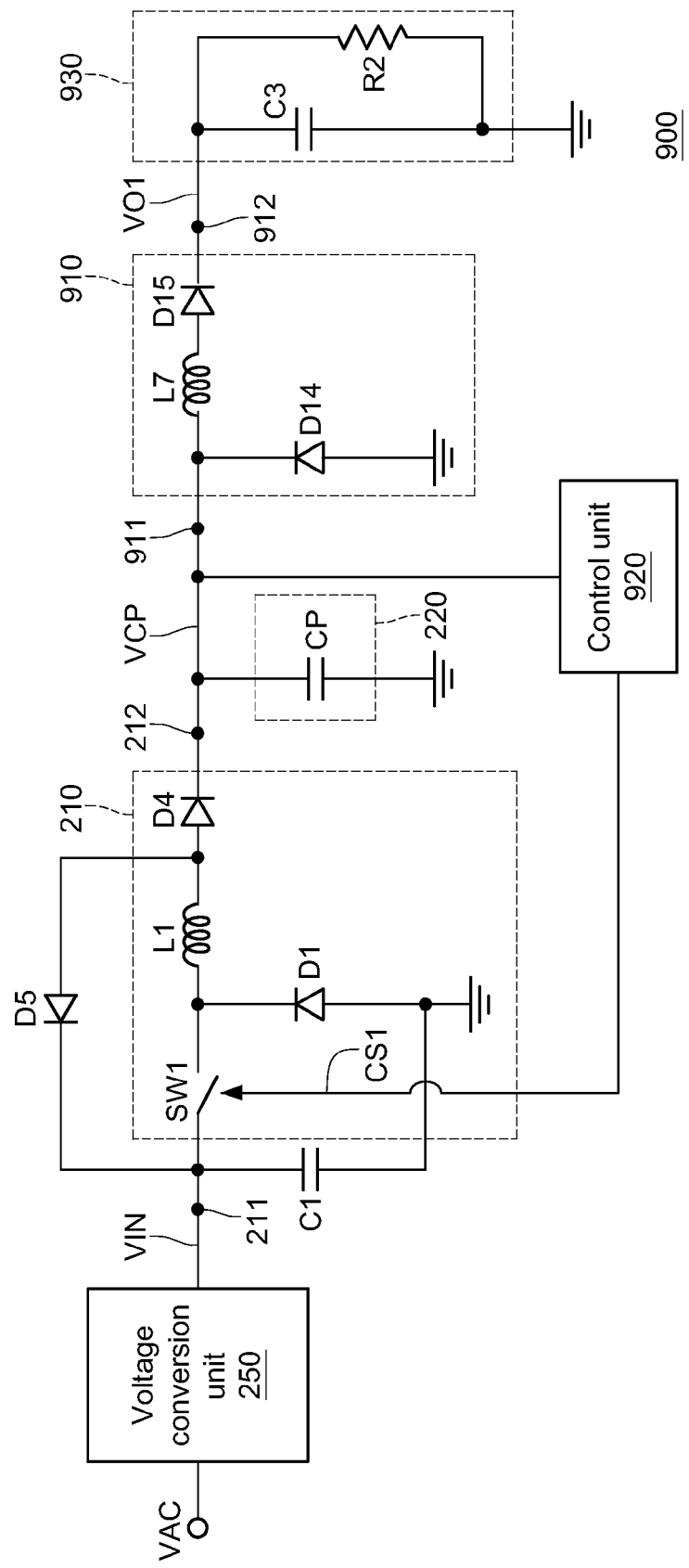
FIG. 11 is a circuit diagram of a power-factor-corrected resonant converter according to an eleventh embodiment of the disclosure.

FIG. 11 is a circuit diagram of the power-factor-corrected resonant converter according to an eleventh embodiment of the disclosure. The power-factor-corrected resonant converter 900 comprises the power-obtaining circuit 210, the energy-storage element 220, an energy-transferred circuit 910, the diode D5, the capacitor C1, a control unit 920, the voltage conversion unit 250 and a load unit 930. The operations of the power-obtaining circuit 210, the energy-storage element 220, the diode D5, the capacitor C1 and the voltage conversion unit 250 in this embodiment can be referred to the descriptions of the second embodiment in FIG. 2, and thus they will not be mentioned herein again.

In this embodiment, the power-obtaining circuit 210 comprises the diode D4. In another embodiment, the diode D4 of the power-obtaining circuit 210 can be omitted in order to save the usage cost of the circuit elements. The same effect can be achieved with or without the diode D4.

The energy-transferred circuit 910 comprises an inductor L7 (corresponding to the seventh inductor of the energy-transferred circuit 810 in the tenth embodiment) and diodes D14 and D15 (corresponding to the fourteenth diode and the fifteenth diode of the energy-transferred circuit 810 in the tenth embodiment). A first end of the inductor L7 is coupled to an input end 911 of the energy-transferred circuit 910. An anode terminal of the diode D14 is coupled to the ground and a cathode terminal of the diode D14 is coupled to the input end 911 of the energy-transferred circuit 910. An anode terminal of the diode D15 is coupled to a second end of the inductor L7 and a cathode terminal of the diode D15 is coupled to an output end 912 of the energy-transferred circuit 910.

The control unit 920 coupled to the first end of the energy-storage element 220 is used for detecting a voltage level of the energy-storage voltage VCP and generating the control signal CS1 based on the voltage level of the energy-storage voltage VCP. For example, when the control unit 920 detects that the voltage level of the energy-storage voltage VCP is detected to be 0V, the control signal CS1 with high logic level is provided for conducting the switch SW1. When the control unit 920 detects that the voltage level of the energy-storage voltage VCP is equal to the input line voltage VIN, the control signal CS1 with low logic level is provided for disconnecting the switch SW1.

A first end of the load unit 930 is coupled to the output end 912 of the energy-transferred circuit 910, and a second end of the load unit 930 is coupled to the ground. The load unit 930 comprises a capacitor C3 and a resistor R2. A first end of the capacitor C3 is coupled to the output end 912 of the energy-transferred circuit 910, and a second end of the capacitor C3 is coupled to the ground. A first end of the resistor R2 is coupled to the first end of the capacitor C3, and a second end of the resistor R2 is coupled to the second end of the capacitor C3.

Firstly, the alternating voltage VAC is converted and rectified by the voltage conversion unit 250 to provide the input line voltage VIN. At this point, the control unit 920 detects that the energy-storage voltage VCP is 0V. Therefore, the control signal CS1 with high logic level is provided to conduct the switch SW1. The inductor L1 of the power-obtaining circuit 210 and the capacitor CP of the energy-storage element 220 formed a resonant circuit. Then, the capacitor CP of the energy-storage element 220 is charged with the input line voltage VIN and the input line power is obtained, so that the voltage of the energy-storage voltage VCP rises continuously. Furthermore, when the control unit 920 detects that the voltage level of the energy-storage voltage VCP rise to be equal to the input line voltage VIN, the control signal CS1 with low logic level is provided for disconnecting the switch SW1.

In an embodiment, based on the control signal CS1, the capacitor CP of the energy-storage element 220 and the power-obtaining circuit 210 operate a soft switching through the inductor L1, the diodes D1 and D4 and the switch SW1 of the power-obtaining circuit 210, so that the energy-storage element 220 is charged with the input line voltage VIN and the energy-storage voltage VCP is generated to obtain the input line power. In another embodiment, based on the control signal CS1, the capacitor CP of the energy-storage element 220 and the power-obtaining circuit 210 operate a soft switching through the inductor L1, the diode D1 and the switch SW1 of the power-obtaining circuit 210, so that the energy-storage element 220 is charged with the input line voltage VIN and the energy-storage voltage VCP is generated to obtain the input line power.

Then, when the voltage level of the input line voltage VIN is larger than the voltage level of an output end 912 of the energy-transferred circuit 910, the inductor L7 and the diodes D14 and D15 of the energy-transferred circuit 910 are in conduction automatically, so that the energy-storage voltage VCP of the energy-storage element 220 is converted into the output power VO1, and the output power VO1 is transferred to the load unit 260.

It can be known from the above that, the difference between the power-factor-corrected resonant converter 900 in this embodiment and the power-factor-corrected resonant converter 200 in the second embodiment are that, the switch SW2 is not used in the energy-transferred circuit 910 so as to reduce circuit elements. Even without the switch SW2, an output voltage or current and an output power can be adjusted and a better power factor can be obtained.

Furthermore, the resonant converter with power factor correction 900 can further be added with energy-storage elements such as energy-transferred circuit and load unit for providing an output power with a higher watts or operating voltages required by the load units. The way of adding elements can be referred to the descriptions of the embodiments in FIGS. 5 to 8, but the switch SW2 is not included in the energy-transferred circuits 310, 410, 510 and 610.

Figure 12:
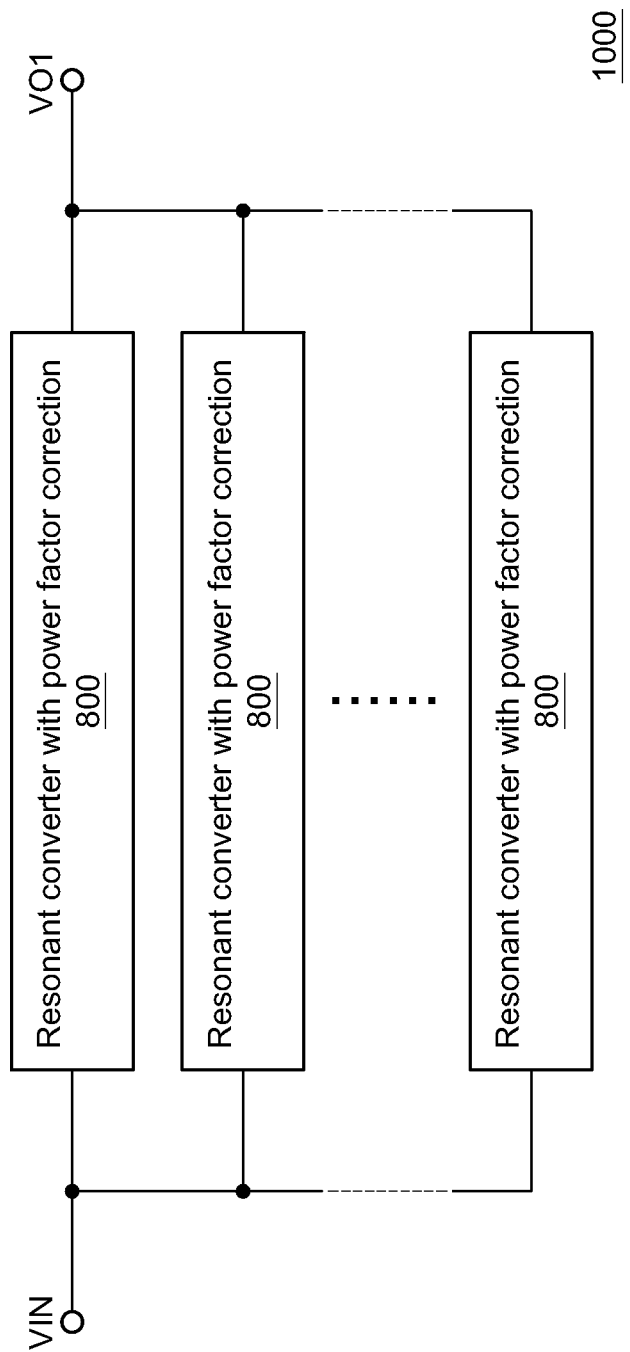
FIG. 12 is an illustration of a parallel power-factor-corrected resonant converter according to a twelfth embodiment of the disclosure.

FIG. 12 is an illustration of the parallel power-factor-corrected resonant converter according to a twelfth embodiment of the disclosure. The power-factor-corrected resonant converter 1000 comprises a plurality of the power-factor-corrected resonant converters 800 as shown in FIG. 10. The input ends and the output ends of the power-factor-corrected resonant converters 800 are respectively connected to each other in parallel. The operations and the internal elements of each power-factor-corrected resonant converter 800 can be referred to the descriptions of the tenth embodiment in FIG. 10, and thus they will not be mentioned herein again. Accordingly, the parallel power-factor-corrected resonant converter 1000 in this embodiment can provide an output power with higher watts for the load end.

Figure 13:
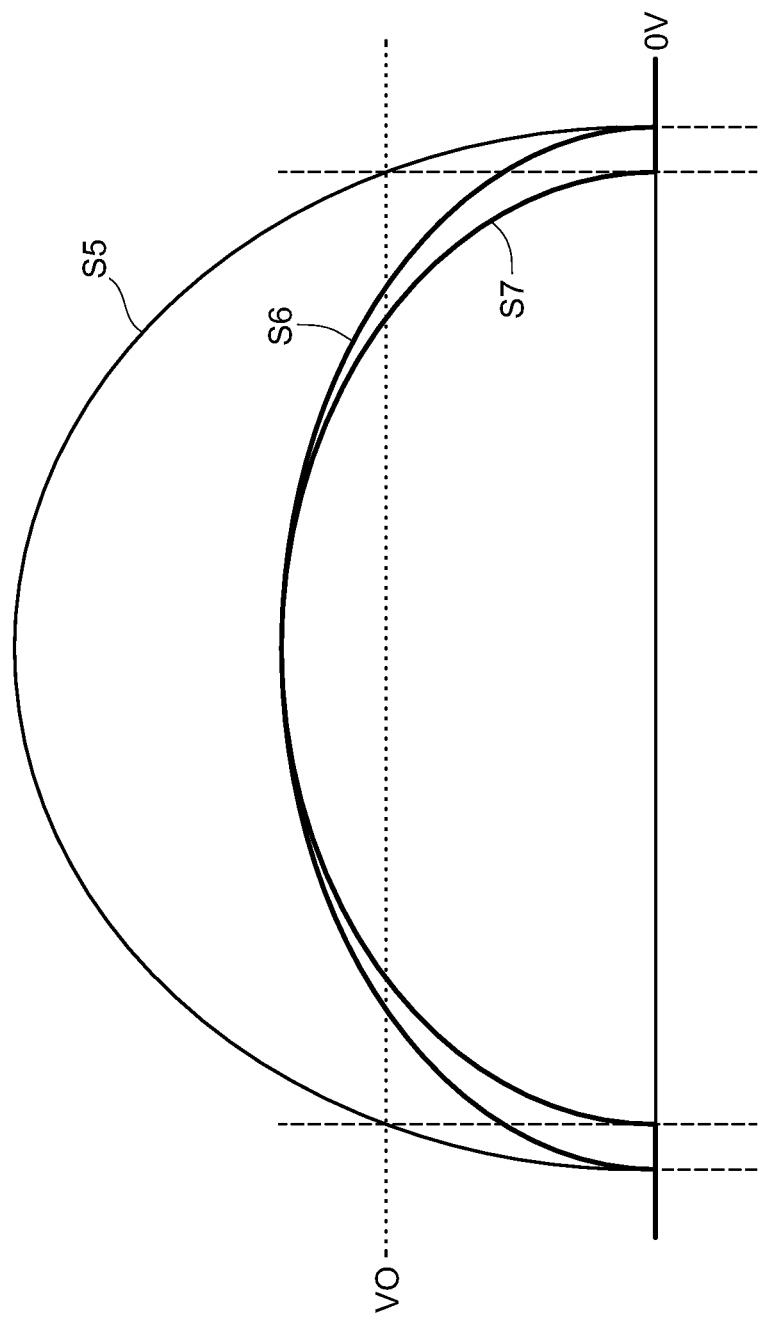
FIG. 13 is a waveform diagram of an alternating voltage and average alternating current of the power-factor-corrected resonant converters 200 and 900 according to a thirteenth embodiment of the disclosure.

FIG. 13 is a waveform diagram of an alternating voltage and average alternating current of the power-factor-corrected resonant converters 200 and 900 according to a thirteenth embodiment of the disclosure. The curve S5 is an alternating voltage VAC of the power-factor-corrected resonant converters 200 and 900. The curve S6 is an average alternating current IAC1 of the power-factor-corrected resonant converter 200. The curve S7 is an average alternating current IAC2 of the power-factor-corrected resonant converter 900.

As shown in FIG. 13, time points for the increasing and decreasing of the alternating voltage VAC and the average alternating current IAC1 of the power-factor-corrected resonant converter 200 are the same by using two operations of soft switching, and therefore the current distortion is not too serious during the current conversion, and the power-factor-corrected resonant converter 200 can achieve an ideal power factor. With fewer circuit elements (i.e. the switch SW2 of the energy-transferred circuit 230 according to FIG. 2) included in the power-factor-corrected resonant converter 900, the average alternating current IAC2 is distorted when the voltage level of the input line voltage VAC is lower than the voltage level of the output power VO1. Nevertheless, as shown in FIG. 13, the power-factor-corrected resonant converter 900 can still achieve a better power factor. Accordingly, the power-factor-corrected resonant converters 200 and 900 can achieve better power factors regardless if the switch SW2 is included in the energy-transferred circuits or not.

According to the power-factor-corrected resonant converter disclosed in the embodiments of the disclosure, the input line power can be obtained and energy can be transferred by starting up different resonant circuits in two stages, i.e. a resonant circuit formed by the coupling of the energy-storage element and the power-obtaining circuit operates a soft switching during the first time period, and another resonant circuit formed by the coupling of the energy-storage element and the energy-transferred circuit operate a soft switching during the second time period. Therefore, a stable output voltage or current and an output power can be generated and a better power factor can be obtained.

The energy-storage voltage of the energy-storage element at most is charged to be equal to the voltage level of the input line voltage, and therefore circuit elements which have lower withstand voltages can be employed for the switches in the power-obtaining circuit and the energy-transferred circuit in order to reduce the usage cost of the circuit elements. Additionally, capacitors of the energy-storage element and inductors of the power-obtaining circuit and the energy-transferred circuit can have small sizes in order to reduce the volumes of the circuit elements. Furthermore, an output power with higher watts or operating voltages required by different load units can be provided by adding other energy-storage elements and load units.

Furthermore, the disclosure provides another type of power-factor-corrected resonant converter which can achieve a better power factor by using a reduced number of switches of the energy-transferred circuit. Therefore, the usage cost of the circuit elements can be reduced. Additionally, the disclosure further provides a parallel power-factor-corrected resonant converter which provides an output power with higher watts. The parallel power-factor-corrected resonant converter is formed by connecting in parallel a plurality of the power-factor-corrected resonant converters.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A power-factor-corrected resonant converter, comprising:
   a power-obtaining circuit, the power-obtaining circuit having an input end and an output end, the input end of the power-obtaining circuit receiving an input line voltage, the power-obtaining circuit comprising a first inductor, a first diode and a first switch;
   a first energy-storage element, a first end of the first energy-storage element electrically connected to the output end of the power-obtaining circuit, and a second end of the first energy-storage element electrically connected to the ground; and
   a first energy-transferred circuit, the first energy-transferred circuit having an input end and an output end, the input end of the first energy-transferred circuit electrically connected to the first end of the first energy-storage element, the output end of the first energy-transferred circuit generating a first output power, the first energy-transferred circuit comprising a second inductor, a second diode, a third diode and a second switch;
   wherein during a first time period, based on a first control signal, the first energy-storage element and the power-obtaining circuit operate a soft switching through the first inductor, the first diode and the first switch of the power-obtaining circuit, so that the first energy-storage element is charged with the input line voltage in order to generate an energy-storage voltage for obtaining the input line power, and during a second time period, based on a second control signal, the first energy-storage element and the first energy-transferred circuit operate a soft switching through the second inductor, the second diode, the third diode and the second switch of the first energy-transferred circuit, so that the first energy-storage element is discharged and the energy-storage voltage is converted into the first output power.

2. The power-factor-corrected resonant converter as claimed in claim 1, wherein a first end of the first switch is electrically connected to the input end of the power-obtaining circuit, the first switch is in conduction during the first time period and disconnected during the second time period, an anode terminal of the first diode is electrically connected to the ground and a cathode terminal of the first diode is electrically connected to a second end of the first switch, a first end of the first inductor is electrically connected to the second end of the first switch, a second end of the first inductor is electrically connected to the output end of the power-obtaining circuit.

3. The power-factor-corrected resonant converter as claimed in claim 2, wherein the power-obtaining circuit further comprises:
   a fourth diode electrically connected between the second end of the first inductor and the output end of the power-obtaining circuit.

4. The power-factor-corrected resonant converter as claimed in claim 2, further comprising:
   a fifth diode, an anode terminal of the fifth diode electrically connected to the second end of the first inductor and a cathode terminal of the fifth diode electrically connected to the first end of the first switch; and
   a first capacitor, a first end of the first capacitor electrically connected to the first end of the first switch and a second end of the first capacitor electrically connected to the anode terminal of the first diode.

5. The power-factor-corrected resonant converter as claimed in claim 1, wherein the first energy-storage element comprises a capacitor or a plurality of capacitors connected in parallel.

6. The power-factor-corrected resonant converter as claimed in claim 1, wherein a first end of the second inductor is electrically connected to the input end of the first energy-transferred circuit, a first end of the second switch is electrically connected to a second end of the second inductor, a second end of the second switch is electrically connected to the ground, the second switch is disconnected during the first time period and in conduction during the second time period, an anode terminal of the second diode is electrically connected to the ground and a cathode terminal of the second diode is electrically connected to the input end of the first energy-transferred circuit, an anode terminal of the third diode is electrically connected to the first end of the second switch and a cathode terminal of the third diode is electrically connected to the output end of the first energy-transferred circuit.

7. The power-factor-corrected resonant converter as claimed in claim 1, further comprising:
a control unit being electrically connected to the first end of the first energy-storage element for detecting a voltage level of the energy-storage voltage and generating the first control signal during the first time period and the second control signal during the second time period based on the voltage level of the energy-storage voltage.

8. The power-factor-corrected resonant converter as claimed in claim 1, further comprising:
a voltage conversion unit electrically connected to the input end of the power-obtaining circuit for receiving an alternating voltage and converting the alternating voltage into the input line voltage.

9. The power-factor-corrected resonant converter as claimed in claim 1, further comprising:
a first load unit, a first end of the first load unit electrically connected to the output end of the first energy-transferred circuit, and a second end of the first load unit electrically connected to a voltage.

10. The power-factor-corrected resonant converter as claimed in claim 9, wherein the first load unit comprises:
a second capacitor, a first end of the second capacitor is electrically connected to the output end of the first energy-transferred circuit, and a second end of the second capacitor is electrically connected to the voltage; and
a resistor, a first end of the resistor is electrically connected to the first end of the second capacitor, and a second end of the resistor is electrically connected to the second end of the second capacitor.

11. The power-factor-corrected resonant converter as claimed in claim 9, wherein the voltage is the energy-storage voltage.

12. The power-factor-corrected resonant converter as claimed in claim 9, wherein the voltage is a ground voltage.

13. The power-factor-corrected resonant converter as claimed in claim 1, further comprising:
a second energy-transferred circuit, the second energy-transferred circuit having an input end and an output end, the input end of the second energy-transferred circuit electrically connected to the input end of the first energy-transferred circuit, the output end of the second energy-transferred circuit electrically connected to the output end of the first energy-transferred circuit, the second energy-transferred circuit comprising a third inductor, a sixth diode, a seventh diode and a third switch;
wherein during the second time period, based on the second control signal, the first energy-storage element and the second energy-transferred circuit further operate the soft switching through the third inductor, the sixth diode, the seventh diode and the third switch of the second energy-transferred circuit, so that the second energy-storage element is discharged and the energy-storage voltage is converted into the first output power.

14. The power-factor-corrected resonant converter as claimed in claim 1, further comprising:
a third energy-transferred circuit, the third energy-transferred circuit having an input end and an output end, the input end of the third energy-transferred circuit electrically connected to the input end of the first energy-transferred circuit, the output end of the third energy-transferred circuit generating a second output power, the third energy-transferred circuit comprising a fourth inductor, an eighth diode, a ninth diode and a fourth switch;
wherein during the second time period, based on the second control signal, the first energy-storage element and the third energy-transferred circuit further operate the soft switching through the fourth inductor, the eighth diode, the ninth diode and the fourth switch of the third energy-transferred circuit, so that the first energy-storage element is discharged and the energy-storage voltage is converted into the second output power.

15. The power-factor-corrected resonant converter as claimed in claim 14, further comprising:
a second load unit, a first end of the second load unit electrically connected to the output end of the third energy-transferred circuit, and a second end of the second load unit electrically connected to a voltage.

16. The power-factor-corrected resonant converter as claimed in claim 15, wherein the voltage is the energy-storage voltage.

17. The power-factor-corrected resonant converter as claimed in claim 15, wherein the voltage is a ground voltage.

18. The power-factor-corrected resonant converter as claimed in claim 1, further comprising:
a second energy-storage element, a first end of the second energy-storage element electrically connected to the output end of the power-obtaining circuit, and a second end of the second energy-storage element electrically connected to a ground end; and
a fourth energy-transferred circuit, the fourth energy-transferred having an input end and an output end, the input end of the fourth energy-transferred circuit electrically connected to the first end of the second energy-storage element, the output end of the fourth energy-transferred circuit electrically connected to the output end of the first energy-transferred circuit, the fourth energy-transferred circuit comprising a fifth inductor, a tenth diode, an eleventh diode and a fifth switch;
wherein during the first time period, based on the first control signal, the second energy-storage element and the power-obtaining circuit further operate the soft switching through the first inductor, the first diode and the first switch of the power-obtaining circuit, so that the second energy-storage element is charged with the input line voltage in order to generate the energy-storage voltage for obtaining the input line power, during the second time period, based on the second control signal, the second energy-storage element and the fourth energy-transferred circuit further operate the soft switching through the fifth inductor, the tenth diode, the eleventh diode and the fifth switch of the fourth energy-transferred circuit, so that the second energy-storage element is discharged and the energy-storage voltage is converted into the first output power.

19. The power-factor-corrected resonant converter as claimed in claim 1, further comprising:
    a third energy-storage element, a first end of the third energy-storage element electrically connected to the output end of the power-obtaining circuit, and the second end of the third energy-storage element electrically connected to a ground end; and
    a fifth energy-transferred circuit, the fifth energy-transferred having an input end and an output end, the input end of the fifth energy-transferred circuit electrically connected to the first end of the third energy-storage element, the output end of the fifth energy-transferred circuit generating a third output power, the fifth energy-transferred circuit comprising a sixth inductor, a twelfth diode, a thirteenth diode and a sixth switch;
    wherein during the first time period, based on the first control signal, the third energy-storage element and the power-obtaining circuit further operate the soft switching through the first inductor, the first diode and the first switch of the power-obtaining circuit, so that the third energy-storage element is charged with the input line voltage in order to generate the energy-storage voltage for obtaining the input line power, during the second timing, based on the second control signal, the third energy-storage element and the fifth energy-transferred circuit further operate the soft switching through the sixth inductor, the twelfth diode, the thirteenth diode and the sixth switch of the fifth energy-transferred circuit, so that the third energy-storage element is discharged and the energy-storage voltage is converted into the third output power.

20. The power-factor-corrected resonant converter as claimed in claim 19, further comprising:
    a third load unit, a first end of the third load unit electrically connected to the output end of the fifth energy-transferred circuit, and a second end of the third load unit electrically connected to a voltage.

21. The power-factor-corrected resonant converter as claimed in claim 20, wherein the voltage is the energy-storage voltage.

22. The power-factor-corrected resonant converter as claimed in claim 20, wherein the voltage is a ground voltage.

23. The power-factor-corrected resonant converter as claimed in claim 1, wherein the voltage level of the energy-storage voltage is one time or two times of the input line voltage.

24. The power-factor-corrected resonant converter as claimed in claim 1, wherein the input line voltage is an alternating voltage or a direct voltage.

25. A parallel power-factor-corrected resonant converter, comprising:
    a plurality of power-factor-corrected resonant converters electrically connected in parallel with each other, each of the power-factor-corrected resonant converter comprising:
    a power-obtaining circuit, the power-obtaining circuit having an input end and an output end, the input end of the power-obtaining circuit receiving an input line voltage, the power-obtaining circuit comprising a first inductor, a first diode and a first switch;
    an energy-storage element, a first end of the energy-storage element electrically connected to the output end of the power-obtaining circuit, and a second end of the energy-storage element electrically connected to the ground; and
    an energy-transferred circuit, the energy-transferred circuit having an input end and an output end, the input end of the energy-transferred circuit electrically connected to the first end of the energy-storage element, the energy-transferred circuit generating an output power, the energy-transferred circuit comprising a second inductor, a second diode, a third diode and a second switch;
    wherein during a first time period, based on a first control signal, the energy-storage element and the power-obtaining circuit operate a soft switching through the first inductor, the first diode and the first switch of the power-obtaining circuit, so that the energy-storage element is charged with the input line voltage in order to generate an energy-storage voltage for obtaining the input line power, during a second time period, based on a second control signal, the energy-storage element and the energy-transferred circuit operate the soft switching through the second inductor, the second diode, the third diode and the second switch of the energy-transferred circuit, so that the energy-storage element is discharged and the energy-storage voltage is converted into the output power, the input ends of the power-obtaining circuits are electrically connected with each other, and the output ends of the energy-transferred circuits are electrically connected with each other.

26. A power-factor-corrected resonant converter, comprising:
    a power-obtaining circuit, the power-obtaining circuit having an input end and an output end, the input end of the power-obtaining circuit receiving an input line voltage, the power-obtaining circuit comprising a first inductor, a first diode and a switch;
    an energy-storage element, a first end of the energy-storage element electrically connected to the output end of the power-obtaining circuit, and the second end of the energy-storage element electrically connected to the ground; and
    an energy-transferred circuit, the energy-transferred circuit having an input end and an output end, the input end of the energy-transferred circuit electrically connected to the first end of the energy-storage element, the output end of the energy-transferred circuit generating an output power, the energy-transferred circuit comprising a seventh inductor, a fourteenth diode and a fifteenth diode;
    wherein based on a control signal, the energy-storage element and the power-obtaining circuit operate a soft switching through the first inductor, the first diode and the switch of the power-obtaining circuit, so that the energy-storage element is charged with the input line voltage in order to generate an energy-storage voltage for obtaining the input line power, when the voltage level of the input line voltage is larger than the voltage level of the output end of the energy-transferred circuit, the seventh inductor, the fourteenth diode and the fifteenth diode are in conduction, so that the energy-storage voltage is converted into the output power by the energy-transferred circuit.

27. The power-factor-corrected resonant converter as claimed in claim 26, wherein a first end of the switch is electrically connected to the input end of the power-obtaining circuit, the switch is in conduction or disconnected based on the control signal, an anode terminal of the first diode is electrically connected to the ground and a cathode terminal of the first diode is electrically connected to a second end of the switch, a first end of the first inductor is electrically connected to the second end of the switch, a second end of the first inductor is electrically connected to the output end of the power-obtaining circuit.

28. The power-factor-corrected resonant converter as claimed in claim 27, wherein the power-obtaining circuit further comprises:
   a fourth diode electrically connected between the second end of the first inductor and the output end of the power-obtaining circuit.

29. The power-factor-corrected resonant converter as claimed in claim 27, further comprising:
   a fifth diode with its anode terminal electrically connected to the second end of the first inductor and its cathode terminal electrically connected to the first end of the switch; and
   a first capacitor with its first end electrically connected to the first end of the switch and its second end electrically connected to the anode terminal of the first diode.

30. The power-factor-corrected resonant converter as claimed in claim 26, wherein the energy-storage element comprises a capacitor or a plurality of capacitors connected in parallel.

31. The power-factor-corrected resonant converter as claimed in claim 26, wherein a first end of the seventh inductor is the input end of the energy-transferred circuit, an anode terminal of the fourteenth diode is electrically connected to the ground and a cathode terminal of the fourteenth diode is electrically connected to the input end of the energy-transferred circuit, an anode terminal of the fifteenth diode is electrically connected to the second end of the seventh inductor and a cathode terminal of the fifteenth diode is electrically connected to the output end of the energy-transferred circuit.

32. The power-factor-corrected resonant converter as claimed in claim 26, further comprising:
   a control unit electrically connected to the first end of the energy-storage element for detecting a voltage level of the energy-storage voltage and generating the control signal based on the voltage level of the energy-storage voltage.

33. The power-factor-corrected resonant converter as claimed in claim 26, further comprising:
   a voltage conversion unit electrically connected to the input end of the power-obtaining circuit for receiving an alternating voltage and converting the alternating voltage into the input line voltage.

34. The power-factor-corrected resonant converter as claimed in claim 26, further comprising:
   a load unit, a first end of the load unit being electrically connected to the output end of the energy-transferred circuit, and a second end of the load unit being electrically connected to the ground.

35. The power-factor-corrected resonant converter as claimed in claim 34, wherein the load unit comprises:
   a second capacitor, a first end of the second capacitor is electrically connected to the output end of the energy-transferred circuit, and a second end of the second capacitor is electrically connected to the ground; and
   a resistor, a first end of the resistor is electrically connected to the first end of the second capacitor, and a second end of the resistor is electrically connected to the second end of the second capacitor.

36. The power-factor-corrected resonant converter as claimed in claim 26, wherein the voltage level of the energy-storage voltage is one time or two times of the input line voltage.

37. The power-factor-corrected resonant converter as claimed in claim 26, wherein the input line voltage is an alternating voltage or a direct voltage.

* * * * *